United States Patent
Fujinawa et al.

(10) Patent No.: US 7,891,826 B2
(45) Date of Patent: Feb. 22, 2011

(54) PROJECTOR

(75) Inventors: Nobuhiro Fujinawa, Yokohama (JP);
Hirotake Nozaki, Port Washington, NY (US); Tetsuya Yamamoto, Hasuda (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 904 days.

(21) Appl. No.: 11/659,336

(22) PCT Filed: Sep. 21, 2005

(86) PCT No.: PCT/JP2005/017402
§ 371 (c)(1),
(2), (4) Date: Feb. 5, 2007

(87) PCT Pub. No.: WO2006/033361
PCT Pub. Date: Mar. 30, 2006

(65) Prior Publication Data
US 2008/0297729 A1    Dec. 4, 2008

(30) Foreign Application Priority Data
Sep. 21, 2004   (JP) .............................. 2004-273234

(51) Int. Cl.
*G03B 21/14* (2006.01)
(52) U.S. Cl. ........................................ 353/119; 353/94
(58) Field of Classification Search ............. 353/31, 353/94, 119; 349/5–9; 362/231, 249.02, 362/349.11, 349.13
See application file for complete search history.

(56) References Cited

U.S. PATENT DOCUMENTS

| | | | |
|---|---|---|---|
| 5,258,844 A | 11/1993 | Nakayama et al. | |
| 5,467,215 A | 11/1995 | Lebby et al. | |
| 5,528,297 A | 6/1996 | Seegert et al. | |
| 6,227,669 B1 | 5/2001 | Tiao et al. | |
| 6,318,863 B1 | 11/2001 | Tiao et al. | |
| 6,489,934 B1 | 12/2002 | Klausner | |
| 6,532,035 B1 | 3/2003 | Saari et al. | |
| 6,542,155 B1 | 4/2003 | Mifune et al. | |
| 6,547,400 B1 * | 4/2003 | Yokoyama | 353/98 |
| 6,830,345 B2 | 12/2004 | Kamm et al. | |
| 6,899,436 B2 * | 5/2005 | Slobodin | 353/94 |
| 6,918,682 B2 * | 7/2005 | Kim et al. | 362/231 |
| 6,975,294 B2 * | 12/2005 | Manni et al. | 345/83 |

(Continued)

FOREIGN PATENT DOCUMENTS

| | | |
|---|---|---|
| CN | 1152367 A | 6/1997 |
| EP | 1 003 064 A1 | 5/2000 |
| JP | A 03-065879 | 3/1991 |
| JP | A 03-070274 | 3/1991 |
| JP | A 04-315376 | 11/1992 |

(Continued)

OTHER PUBLICATIONS

Chinese Office Action issued in Chinese Application No. 200580027866.0; Issued Dec. 18, 2009.

*Primary Examiner*—William C Dowling
(74) *Attorney, Agent, or Firm*—Miles & Stockbridge P.C.

(57) ABSTRACT

A projector includes: an image creation unit that projects image information upon a screen, comprising a plurality of picture elements that create an image pattern corresponding to the image information; and an illumination unit in which light emitting members are disposed upon a vertical plane with respect to an optical axis which passes through a center of the image creation unit, at equal distances from the optical axis and moreover in different locations.

17 Claims, 19 Drawing Sheets

U.S. PATENT DOCUMENTS

| | | | |
|---|---|---|---|
| 7,052,145 B2 * | 5/2006 | Glenn | 353/94 |
| 7,192,140 B2 * | 3/2007 | Hosaka | 353/31 |
| 7,270,425 B2 * | 9/2007 | Arai et al. | 353/87 |
| 7,400,826 B2 | 7/2008 | Helbing et al. | |
| 7,710,391 B2 | 5/2010 | Bell et al. | |
| 2002/0063855 A1 | 5/2002 | Williams | |
| 2002/0176015 A1 | 11/2002 | Lichtfuss | |
| 2003/0107656 A1 | 6/2003 | Ito et al. | |
| 2003/0165048 A1 | 9/2003 | Bamji et al. | |
| 2005/0073845 A1 | 4/2005 | Matsui | |
| 2005/0134723 A1 | 6/2005 | Lee et al. | |
| 2005/0212062 A1 * | 9/2005 | Chang | 257/401 |
| 2006/0033831 A1 | 2/2006 | Ejima et al. | |
| 2007/0159453 A1 * | 7/2007 | Inoue | 345/156 |
| 2007/0195173 A1 * | 8/2007 | Nozaki et al. | 348/216.1 |
| 2008/0018591 A1 * | 1/2008 | Pittel et al. | 345/156 |
| 2008/0049192 A1 * | 2/2008 | Nozaki et al. | 353/25 |
| 2008/0079916 A1 * | 4/2008 | Noba | 353/119 |
| 2008/0259289 A1 * | 10/2008 | Nozaki et al. | 353/70 |
| 2009/0036158 A1 * | 2/2009 | Fujinawa et al. | 455/556.1 |
| 2009/0051832 A1 | 2/2009 | Banks et al. | |
| 2009/0290129 A1 * | 11/2009 | Yoshida | 353/31 |
| 2009/0310091 A1 * | 12/2009 | Nozaki et al. | 353/85 |
| 2010/0190524 A1 * | 7/2010 | Morozumi | 455/556.1 |

FOREIGN PATENT DOCUMENTS

| | | |
|---|---|---|
| JP | A 05-137039 | 6/1993 |
| JP | A 07-058814 | 3/1995 |
| JP | A 08-234154 | 9/1996 |
| JP | A 11-276430 | 10/1999 |
| JP | A-2000-171685 | 6/2000 |
| JP | A 2000-194275 | 7/2000 |
| JP | A 2000-214528 | 8/2000 |
| JP | A 2001-021992 | 1/2001 |
| JP | A 2001-511913 | 8/2001 |
| JP | A 2002-516044 | 5/2002 |
| JP | A 2002-171428 | 6/2002 |
| JP | A 2002-199060 | 7/2002 |
| JP | A 2003-098580 | 4/2003 |
| JP | A 2003-174587 | 6/2003 |
| JP | A 2003-207825 | 7/2003 |
| JP | A-2003-315672 | 11/2003 |
| JP | A 2004-126144 | 4/2004 |
| JP | A 2004-151651 | 5/2004 |
| JP | 2004-163699 | 6/2004 |
| JP | A 2004-184852 | 7/2004 |
| WO | WO 98/19435 | 5/1998 |
| WO | WO 98/37455 | 8/1998 |
| WO | WO 2006/033360 A1 | 3/2006 |

* cited by examiner (a)　　　　　　　　　　(b)

FIG. 24

[FLASH SETTING]

1. ILLUMINATION COLOR SETTING

| WHITE | REDDISH | GREENISH | BLUISH | YELLOWISH |

1. ILLUMINATION AREA SETTING

| ALL OVER | UPPER | LOWER | RIGHT | LEFT |

1. HALFTONE AT ILLUMINATION BOUNDARY

| NO | YES | | | CONFIRM |

PROJECTOR

TECHNICAL FIELD

The present invention relates to a compact projector and imaging unit housed in a portable type information device such as a portable telephone or the like.

BACKGROUND ART

From the past, projector devices of various types which project an image pattern formed upon a liquid crystal (LCD) panel or the like via a projection lens onto a screen have been known. And, from the past, such projectors have been large in size and high in price, and have mainly been used for business applications. However, in recent years the demand for large screen appreciation in typical households has increased, and, along with this, the shapes of such projector devices have also recently become quite compact, and their prices have also decreased to a level at which they can be purchased by individuals. In the past, a high luminance xenon lamp has been used as a light source. However, not only is such a lamp high in price, but moreover, along with a fixed procedure being required for turning it ON and OFF, also a fan has been required for dissipation of heat.

By contrast, light emitting diodes (LEDs) which generate low heat and are high in luminance have recently been developed. Moreover, as well as red colored LEDs and green colored LEDs, by also implementing LEDs which emit blue color as well, the development of projectors for consumer use which employ LEDs as light sources has progressed rapidly. In Japanese Laid-Open Patent Publication No. H8-234154 there is disclosed a reflective type SLM integrated photoelectric package in which one or more LEDs are used as a light source. And, in Japanese Laid-Open Patent Publication No. 2004-126144, there is disclosed an illumination unit which can provide extremely bright illumination by instantaneously emitting powerful light for a predetermined time period from each of several light emitting elements such as LEDs or the like.

On the other hand, in recent years, the diffusion of portable telephones has been spectacular, and, apart from normal conversation, they have been provided with various types of function such as email, internet, and the like. Moreover, recently the multi-functional capability of portable telephones has also progressed more and more, with portable telephones endowed with the function of photography and incorporating an image sensor having more than two megapixels being brought on the market.

Various types of invention have also been made in the past by combining a projector of the type described above and a portable device. In Japanese Laid-Open Patent Publication No. H3-65879 there is disclosed a camera with integrated projection display function, which employs a lens system of a photographic means also as a projection display means by using a half mirror or by using a total reflection mirror which rotates. In Japanese Laid-Open Patent Publication No. H5-137039 there is disclosed an electronic camera which is endowed with the function of a projector. With this electronic camera, an image may be projected upon a screen via the photographic lens by selectively fitting an eyepiece portion and a light. In Japanese Laid-Open Patent Publication No. H7-58814 there is disclosed a portable telephone device which is provided with an image projection unit in a predetermined position in the telephone device main body. And in Japanese Laid-Open Patent Publication No. 2001-21992 there is disclosed a portable telephone in which a display, a projector, and a control unit are housed within its chassis. In this publication, a light source unit consists of, for example, a white colored light emitting organic EL. Moreover in Japanese Laid-Open Patent Publication No. 2002-171428 there is disclosed a digital camera in which a CCD or optical system is shifted corresponding to the selection of projection mode.

And in Japanese Laid-Open Patent Publication No. 2002-199060 (US 2002-63855A) there is disclosed a portable type computing device including a circuit which transmits to a video projector output which is being displayed upon a display screen integral with the computing device. And in Japanese Translation of PCT International Application No. 2002-516044 (WO 98/19435) there is disclosed a portable communication device which includes a micro display system employing a compact high resolution active matrix liquid crystal display with an illumination system, and a magnification optical system. In this publication, an embodiment is disclosed in which a light source for backlighting employing a plurality of LEDs and a rear projection screen are used, so that several persons at one time are able to observe the image which is being displayed. Finally, in U.S. Pat. No. 6,489,934 there is disclosed a portable wireless device equipped with a projector which, as well as performing display of the entirety of an original page which has been received upon an incorporated display, also projects it upon an external screen.

DISCLOSURE OF THE INVENTION

Problems to be Solved by the Invention

Although, with the inventions described above, it is anticipated that improvements in compactness will be obtained by using LEDs as light sources, those inventions do not extend further than simply replacing the lamps of the prior art by LEDs. Moreover, in relation to the arrangement for the LEDs, groups may be formed consisting of LEDs which emit the three types of light R, G, and B, and a plurality of these groups may be arranged upon a plane. Or, LEDs which emit white colored light may simply be arranged upon a plurality of planes.

With the present invention, a super-compact projector is implemented which employs a light emitting unit consisting of LEDs or an organic EL element to the minimum limit, according to the usage objective.

Means for Solving the Problems

A projector according to a first aspect of the present invention includes: an image creation unit that projects image information upon a screen, comprising a plurality of picture elements that create an image pattern corresponding to the image information; and an illumination unit in which light emitting members are disposed upon a vertical plane with respect to an optical axis which passes through a center of the image creation unit, at equal distances from the optical axis and moreover in different locations.

According to a second aspect of the present invention, in the projector according to the first aspect, it is preferable that each of the light emitting members emits light of a single individual color.

According to a third aspect of the present invention, in the projector according to the second aspect, it is preferable that the emitted light of a single color is any one of white colored light, red colored light, green colored light, blue colored light, and yellow colored light.

According to a fourth aspect of the present invention, in the projector according to the first aspect, it is preferable that the illumination unit includes light emitting members all of which emit light of a same color.

According to a fifth aspect of the present invention, in the projector according to the first aspect, it is preferable that the illumination unit comprises light emitting members which emit light of two or more colors.

According to a sixth aspect of the present invention, in the projector according to the fifth aspect it is preferable that in the light emitting members which emit light of two or more colors, only one light emitting member of each color is used.

According to a seventh aspect of the present invention, it is preferable for the projector according to the fifth aspect to include an illumination control unit that selects and turn on a light emitting member of a predetermined light emitting color from among the light emitting members.

According to a eighth aspect of the present invention, the projector according to the seventh aspect, it is preferable that the illumination control unit illuminates the selected light emitting member continuously.

According to a ninth aspect of the present invention, in the projector according to the seventh aspect, it is preferable that the illumination control unit illuminates the selected light emitting members in order in time series at predetermined time intervals.

According to a tenth aspect of the present invention, it is preferable for the projector according to the ninth aspect to include an image control unit that creates a predetermined image upon the image creation unit according to the light emitting members selected by the illumination control unit.

According to a 11th aspect of the present invention, the projector according to the first aspect, it is preferable that a total area of light emitting portions of the light emitting members is made not to be greater than an area of the image creation unit.

According to a 12th aspect of the present invention, in the projector according to the first aspect, it is preferable that the light emitting members are light emitting diodes.

According to a 13th aspect of the present invention, the projector according to the first aspect, it is preferable that the image creation unit is a liquid crystal.

According to a 14th aspect of the present invention, the projector according to the first aspect, it is preferable that the image creation unit is a Digital Micromirror Device.

A projector according to a 15th aspect of the present invention includes: an image creation unit, through which image information is projected upon a screen, that comprises a plurality of picture elements that create an image pattern corresponding to the image information; and a light emitting diode constituting a single light emitting member of an area substantially equal to an area of the image creation unit.

EFFECT OF THE INVENTION

Since the present invention has the structure described above, it is capable of providing a super-compact projector.

BRIEF DESCRIPTION OF THE DRAWINGS

FIG. 24 is a figure for explanation of a setting menu display for a flash light of this portable telephone equipped with a projector function.

BEST MODE FOR CARRYING OUT THE INVENTION

First Embodiment

A portable type information device according to the first embodiment of the present invention will now be explained with reference to the drawings. In this first embodiment, as a portable type information device, the example will be cited of a fold up type portable telephone equipped with a projector function.

Figure 1:
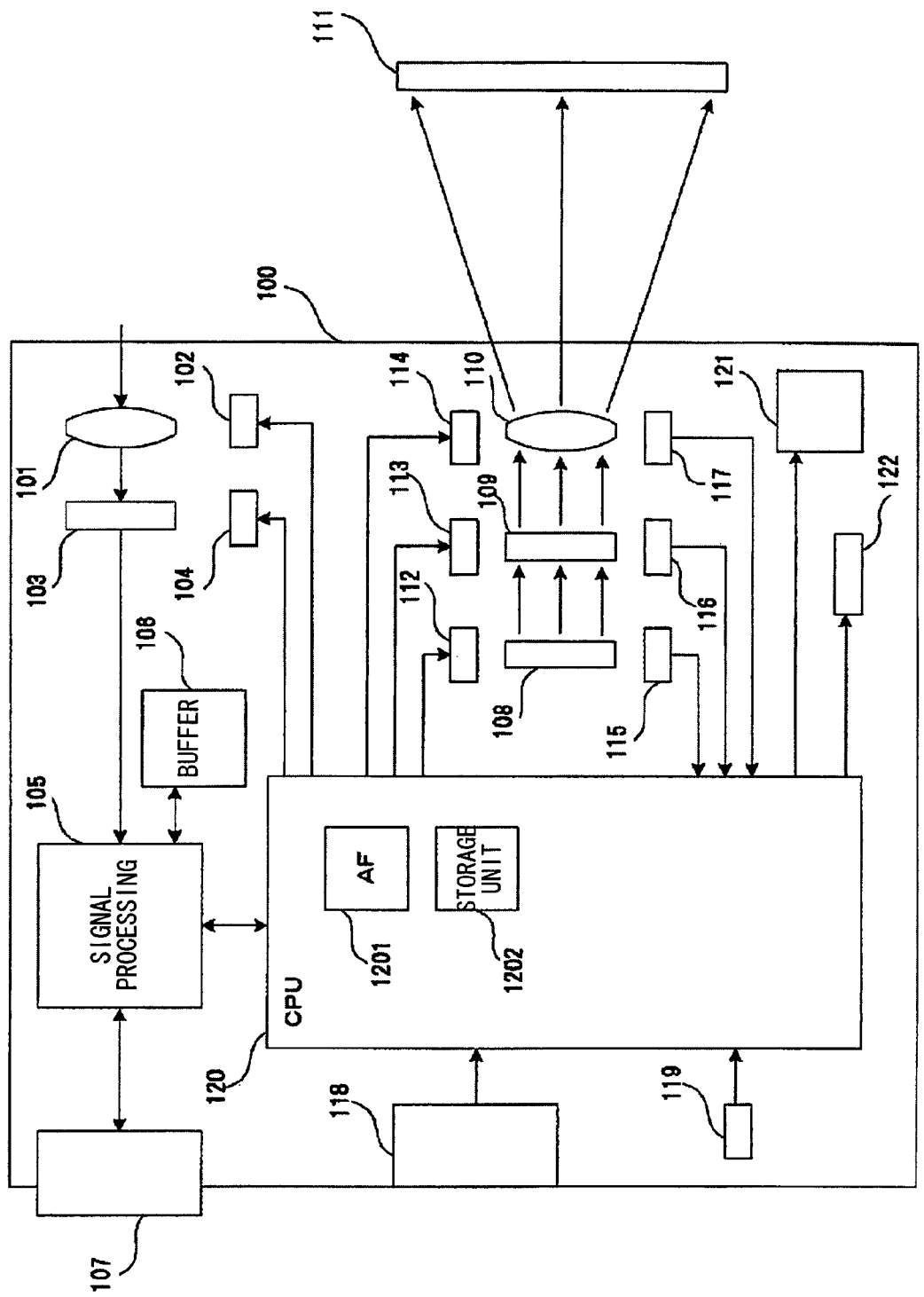
FIG. 1 is a block diagram showing the structure of a portable telephone equipped with a projector function, according to a first embodiment of the present invention.

This portable telephone according to the first embodiment includes a portable telephone functional portion which principally performs communication with the exterior such as telephonic conversation with an opposite party and transmission and reception of email and so on, a digital camera unit which photographs objects to be photographed, and an ultra-compact projector unit which projects images and data information upon a screen external to the portable telephone. A schematic illustration of the digital camera unit and the projector unit which are mounted to this portable telephone is shown in FIG. 1. Since the present invention has no direct relationship with the portable telephone functional portion, explanation thereof will be omitted.

The digital camera unit which is installed in a portable telephone main body 100 includes a photographic lens 101, a lens driver 102, an image sensor 103, a driver 104, a signal processing circuit 105, a buffer memory 106, a CPU 120, and so on.

The photographic lens 101 is constituted of a zoom lens for continuously varying its focal point distance, and a focus lens for adjusting the focus. These lenses are driven by the lens driver 102. The lens driver 102 which drives the photographic lens 101 includes a zoom drive mechanism for the zoom lens and a drive circuit for it, and a focus drive mechanism for the focus lens and a drive circuit for it. This lens driver 102 is controlled by the CPU 120. The photographic lens 101 forms an image of a subject upon a photographic surface of the image sensor 103. This image sensor 103 is a photoelectric conversion element which outputs an electrical signal corresponding to the optical intensity of the subject which has been imaged upon its photographic surface; for this, a CCD type or MOS type solid-state image sensor may be used. The driver 104 controls the timing of taking out the signal from the image sensor 103.

The photographic signal from the solid-state image sensor 103 is inputted to the signal processing circuit 105. This signal processing circuit 105 performs analog processing such as correlated double sampling processing (CDS) and the like upon the photographic signal inputted from the image sensor 103, and then converts it into a digital signal. The image signal which has thus been converted into a digital signal is further subjected to various types of image processing by the signal processing circuit 105, such as contour enhancement, gamma compensation, white balance compensation, and the like. The buffer memory 106 is a frame memory which can store the data of a plurality of frames which have been photographed by this image sensor 103. The signal which has been converted into digital data by the signal processing circuit 105 is temporarily stored in this buffer memory 106. The signal processing circuit 105 again reads in the data which has been converted into digital data and stored in the buffer memory 106, and performs the various types of image processing described above. The data after image processing is again stored in the buffer memory 106.

An external storage device 107 is a compact storage medium such as a non-volatile memory card or the like, which can be fitted to and removed from the portable telephone main body 100. The image data having been image processed and recorded in the buffer memory 106 is recorded upon this external storage device 107 which has been inserted into the portable telephone main body 100, according to a signal from the CPU 120. It should be understood that it is also possible to read out the image data stored in this external storage device 107 and to project it upon an external screen 111, using the projector unit which will be described hereinafter.

The CPU 120 performs sequence control during the operation of the digital camera unit and the projector unit. Of course, it may also perform control of the portable telephone functional portion, not shown in the figures. AF calculation based upon the image signal from the image sensor 103 is performed by an AF calculation unit 1201 of the CPU 120, and AF control is performed by driving the photographic lens 101 with the lens driver 102 based upon the result of this calculation. The result of this calculation is also stored in a storage unit 1202. As the AF method, for example, the contrast method or the phase difference method are available, and AF (focus adjustment) control may be performed by using any such method.

Next, the projector unit which is mounted to the portable telephone main body 100 will be explained. This projector unit is constituted of a light source 108, a liquid crystal panel for projection 109, a projection lens 110, drivers 112, 113 and 114 for respectively controlling the light source 108, the liquid crystal panel 109 and the projection lens 110, position detectors 115, 116 and 117, the CPU 120, and the like.

The light source 108 includes one or a plurality of high luminance light emitting diodes (LEDs). The liquid crystal panel (LCD) for projection 109 is a transparent type liquid crystal panel, and forms an image to be displayed by projection at the exterior of the portable telephone main body 100. The illumination light which is generated by the light source 108 passes through this LCD panel for projection 109 upon which an image pattern for projection is formed, and further is radiated to the exterior via the projection lens 110. Due to this, the image data for projection which has been formed upon the LCD panel for projection 109 is displayed via the projection lens 110 upon an external screen 111 in magnified form.

The portable telephone main body 110 is provided with a liquid crystal (LCD) monitor 121 and a liquid crystal (LCD) panel for display 122. The LCD monitor 121 has a display section 1 to 2 inches in size, and can display image data in addition to character data. The LCD panel for display 122 is a character only display. Under control of the CPU 120, the projector unit projects character data and/or image data which is being displayed upon the LCD monitor 121 or upon the LCD panel for display 122 upon the screen 111 as data for projection (projection information). The number of pixels upon the LCD monitor 121 may be, for example, 320×240 pixels, while the number of pixels upon the LCD panel for display 122 may be, for example, around 100×20 pixels. If spare electrical power capacity and space are available, the same member may be used for the LCD panel for display 122 and the LCD monitor 121.

When projecting upon the screen 111 the character data which is being displayed upon the LCD panel for display 122, the focal point of the projection lens 110 is adjusted so as to make the projection distance from the portable telephone main body 100, in concrete terms from the projection lens 110, to the screen 111 be within, for example, the range of 10 cm~100 cm. Postcard sized white paper or a handy white wall surface or the like may be used as the screen 111. If the portable telephone is placed upon a desk, it would also be acceptable to arrange to project the data for projection upon the same surface as that surface upon which the portable telephone is placed. Since, in this case, the projection screen becomes trapezoidal, the data which is generated upon the LCD panel for projection 109 is compensated in advance for this deformation of the projection screen.

The driver 112 controls the timing of the ON/OFF and the light emitting intensity of the light source 108 according to a control signal from the CPU 120. The driver 113 performs control for individually setting the transitivity of each of the pixels in the LCD panel for projection 109, thus creating an image for projection upon the LCD panel for projection 109, according to a control signal from the CPU 120. Moreover, the driver 113 also functions as a retraction means for shifting the LCD panel for projection 109, as will be described hereinafter.

The driver 114 drives the projection lens 110 based upon the result of AF calculation by the AF calculation unit 1201 of the CPU 120, so that the focal point distance of the projection lens 110 becomes equal to a value which corresponds to this AF calculation result. By doing this, it is possible to perform focal point adjustment of the projection lens 110, and to project a well focused projection image upon the screen 111.

The position detectors 115, 116, and 117 are sensors which detect the positions of the light source 108, the LCD panel for projection 109, and the projection lens 110, respectively. These position detectors 115, 116, and 117 detect whether or not the light source 108, the LCD panel for projection 109, and the projection lens 110 are in predetermined positions during the operation of the projector unit, and also when it is not operating.

An actuation member 118 consists of various actuation switches or buttons actuated by the user, such as an ON/OFF switch for the light source 108, an operational mode setting dial, and so on. In other words, this actuation member 118 is a member which is actuated by the user in order to operate the functional portion of the portable telephone, its digital camera unit, and its projector unit. And an angle detector 119 detects the angle subtended between the upper chassis portion of this fold up type portable telephone and its lower chassis portion, as will be described hereinafter, and outputs it to the CPU 120.

In order to install the projector unit explained above in the main body 100 of the portable telephone, it is necessary to make this projector unit as a whole more compact, and, for this, it is necessary to make the light source 108 ultra-compact. In the following, the light source 108 which is applied to the projector unit of the portable telephone according to the first embodiment will be explained using FIGS. 9 through 13.

Figure 9:
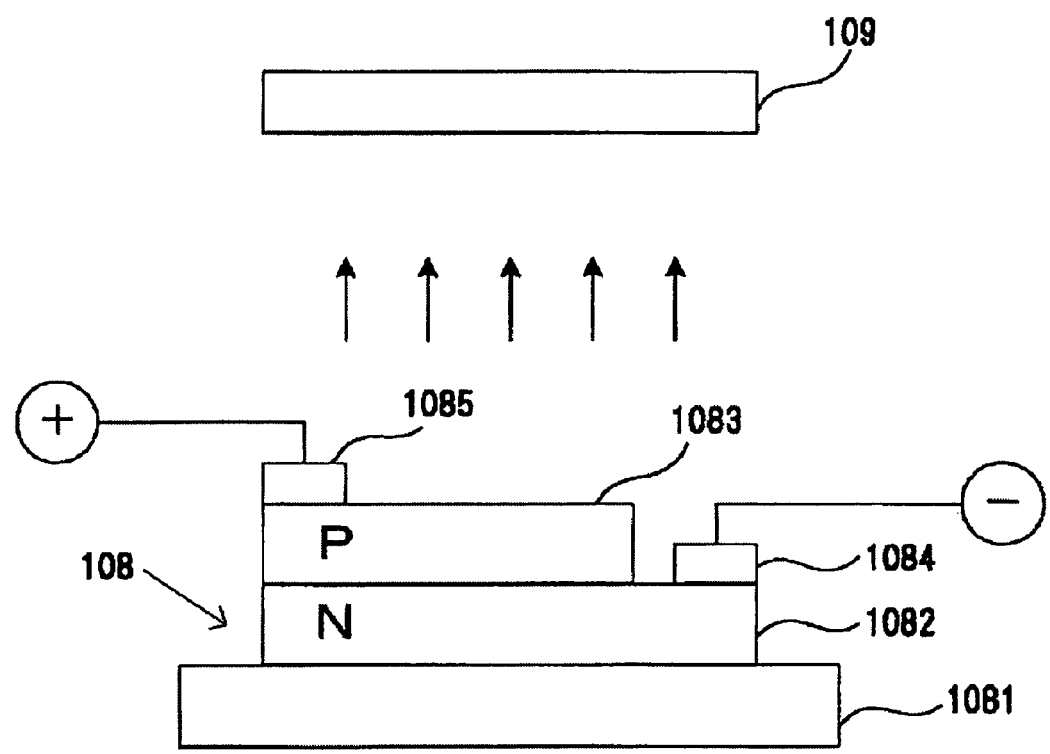
FIG. 9 is a figure for explanation of the size of a light source unit of this portable telephone equipped with a projector function.

The schematic structure of the light source 108 is shown in FIG. 9. In this light source 108 shown in FIG. 9, only a single LED is employed, and the size of the light emitting surface of this LED is almost the same as the size of the transparent surface of the LCD panel for projection 109. As shown in FIG. 9, this light source 108 has a light emitting surface in which an n-type semiconductor 1082 and a p-type semiconductor 1083 are contacted together upon a substrate 1081. The size of this light emitting surface is almost the same as the size of the LCD panel for projection 109. Electrodes 1084 and 1085 are formed upon these semiconductors for respectively applying a – (minus) voltage and a + (plus) voltage. It should be understood that while, here, a simple junction-structure is explained, of course some other structure may be employed.

The color of the emitted light is determined according to the semiconductor material of which this LED is made; for example, if GaP is used, a green colored LED results. Generation of red, blue, yellow etc. colored light can also be implemented by varying the semiconductor material and the joining structure. On the other hand, in the case of a white colored light emitting LED, this is implemented by providing a blue colored LED, and by putting a YAG (yttrium-aluminum-garnet) type phosphor upon the front surface of this blue colored LED. In other words, the blue colored light generates yellow colored light when it impinges upon this phosphor, and this yellow colored light which has been thus generated and the original blue colored light which has passed through the phosphor layer mix to generate white colored light.

Along with increase in the number of pixels in an LCD panel for projection 109, the size of the LCD panel for projection 109 also becomes larger. Accordingly, as shown in FIG. 9, sometimes it becomes difficult to cover the area of the LCD panel for projection 109 with only the light emitting surface of a single LED. In this case, it is necessary to employ a plurality of LEDs as the light source 108. In this embodiment, even if a plurality of LEDs are used, reduction of the consumption of electrical power is anticipated by limiting the number of LEDs which are used to the minimum possible, along with simplification of the construction.

In FIGS. 10 through 13, various schematic structures for the case of employing a plurality of LEDs as the light source 108 for the projector unit are shown.

Figure 10:
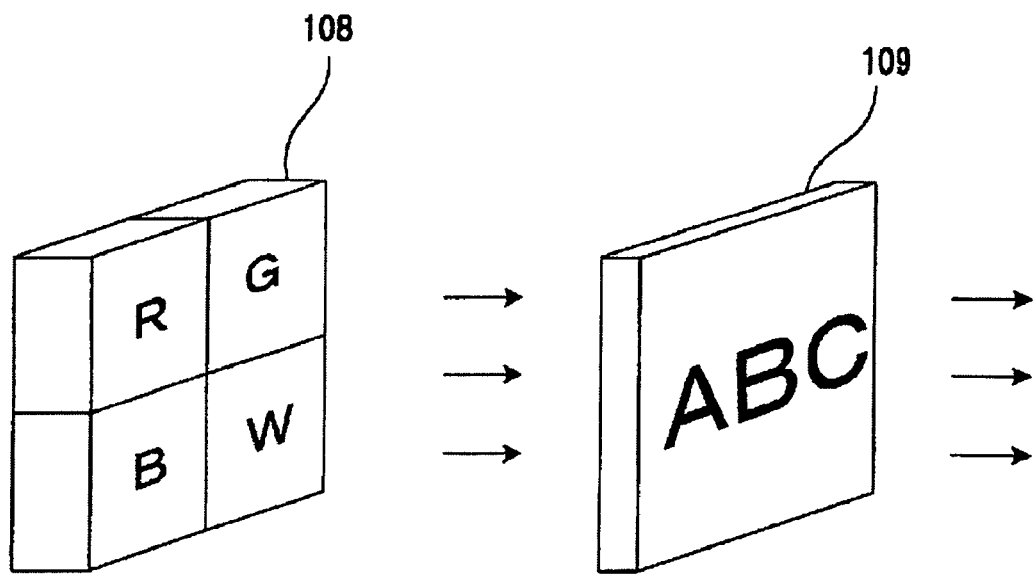
FIG. 10 is a figure for explanation of an example of the use of a plurality of LEDs in this light source unit of the portable telephone equipped with a projector function.

In a light source 108A shown in FIG. 10, four LEDs are used. As shown in FIG. 10, these four LEDs are arranged upon the same plane, so that the total size of the light emitting surfaces of the four LEDs is almost the same as the size of the LCD panel for projection 109. In this light source 108A, there are employed one red (R) LED, one blue (B) LED, one green (G) LED, and one white (W) LED. In this case, the drive method for these LEDs is different, according to whether the LCD panel for projection 109 is a color LCD or a monochrome LCD.

If the LCD panel for projection 109 is a color LCD in which an on-chip color filter is provided, then all four of these LEDs are made to emit light at the same time continuously so as to mix with their light color upon the screen 111 to become white colored light, and sets of image data are generated with pixels of the LCD panel for projection 109, each corresponding to the various colors. On the other hand, if the LCD panel for projection 109 is a monochrome LCD, then each of these four types of LCD is controlled so as, in order, to emit light for a length of around 1/60 seconds. And image data is generated at the LCD panel for projection 109 in synchronization with the respective light emission colors of these LEDs, according to the light emitting color. It should be understood that although, even if only the basic three R, G, and B light sources were present, the projected image would be visually averaged and recognized upon the screen 111 as being a colored image, in addition a white colored LED is used in the light source 108A, in order further to increase the brightness upon the screen.

Figure 11:
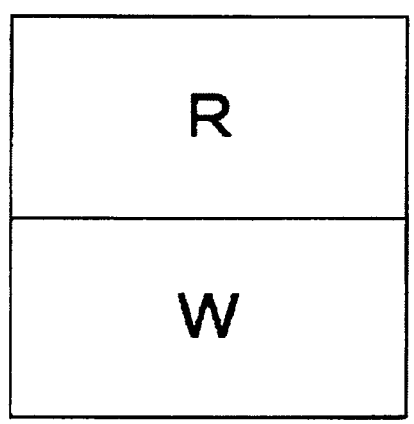
FIG. 11 is a figure for explanation of another example of the use of a plurality of LEDs in this light source unit of the portable telephone equipped with a projector function.
Figure 12:
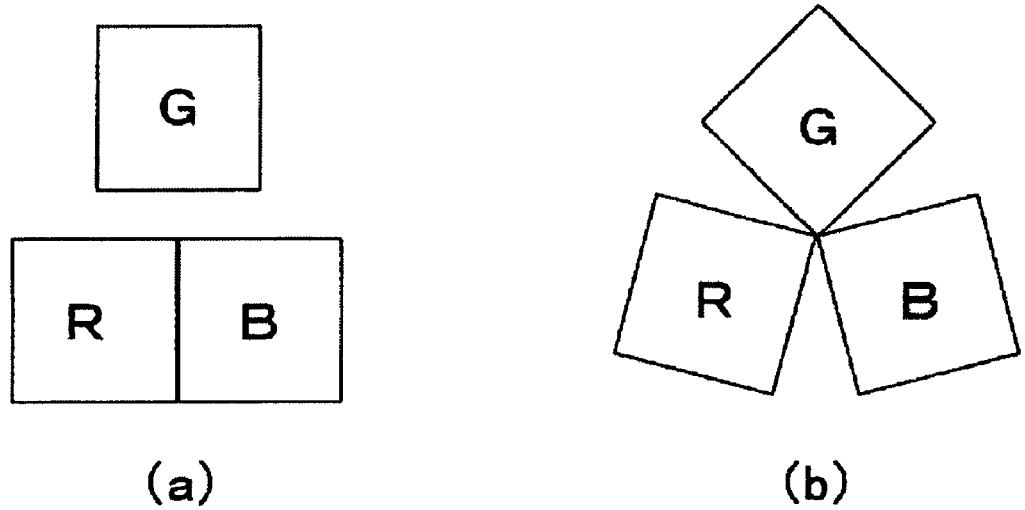
FIGS. 12(a) and 12(b) are figures for explanation of another example of the use of a plurality of LEDs in this light source unit of the portable telephone equipped with a projector function.

In FIG. 11, there is shown a light source 108B in which two LEDs are used. In this light source 108B, a red (R) and a white (W) LED are lined up together, and the structure is such that the total size of the light emitting surface of these two LEDs is almost equal to the size of the LCD panel for projection 109. When this light source 108B is used, the LCD panel for projection 109 should be a monochrome LCD. In this case, normally only the W LED emits light continuously; but, if it is desired to provide an accentuated display, as when issuing a warning or the like, instead of this W LED, the R LED is made to emit light. It should be understood that, in the same manner as with the white LED described above, it would also be acceptable to arrange to use a blue (B) and a yellow (Y) LED, and to mix their colors to obtain white colored light.

In FIGS. 12(a) and (b), there is shown a light source 108C in which three LEDs are used, R, G, and B. As shown in FIGS. 12(a) and 12(b), these three LEDs are arranged so that their respective centers fall at equal distances from the center of the LCD panel for projection 109. In FIG. 12(b), the arrangement also takes the shape of the LEDs into consideration. If such a light source 108C is employed, in the same manner as in the case of FIG. 10, the LCD panel for projection 109 may be either a monochrome LCD or a color LCD.

Figure 13:
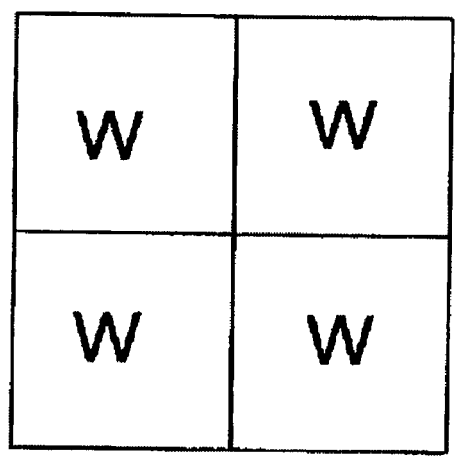
FIG. 13 is a figure for explanation of another example of the use of a plurality of LEDs in this light source unit of the portable telephone equipped with a projector function.

In FIG. 13, there is shown a light source 108D in which four LEDs are used. Although in FIG. 10 described above the light source 108A was shown in which LEDs for emitting light of four different colors were used, in this light source 108D shown in FIG. 13, only four white (W) LEDs are employed. In this case, a color LCD is used as the LCD panel for projection 109. The four LEDs are made to emit light continuously at the same time.

As shown in FIGS. 10 through 13, if a plurality of LEDs are used for the light source 108A through 108D, this plurality of LEDs are positioned so that the center position of each of the LEDs, in other words the central position of its light emitting surface, comes to be positioned at an equal distance from a straight line which is perpendicular to the image formation surface of the LCD panel for projection 109 and passes through the center of the LCD panel for projection 109. By doing this, it is possible to suppress light emission blotching and color blotching to the minimum, even though the plurality of LEDs are disposed at mutually differing positions. Furthermore, if a member which diffuses light is inserted between the light source 108 and the LCD panel for projection 109, the above described light emission blotching and color blotching may be further reduced.

Furthermore, by setting different light emitting intensity for each of the LEDs which emit light of different colors, it is possible to generate illumination light of any desired color. This is the case both when they are made to emit light in order in time series, and when they are made to emit light continuously.

As explained above, by employing the minimum number of LEDs, it becomes possible to implement the compact light source unit 108 which can be installed in the portable telephone main body 100. Furthermore, it would also be acceptable to use an organic EL element as the light source unit 108, instead of the LEDs described up to this point. It should be understood that, both for LEDs and for an organic EL element, up till this point, the case has been explained in which they are used as means for illuminating the LCD panel for projection 109 upon which projection information is generated. By contrast, if the LEDs or the organic EL element are sufficiently compact and of sufficiently high luminance, it also becomes possible, instead of the combination of light source unit and LCD panel for projection which has been described up to this point, simply to dispose a plurality of these LEDs or organic EL elements within the same area as the transparent area of the LCD panel for projection 109. By doing this, it also becomes possible to generate a pattern for direct projection by self-emission of light.

Furthermore, although in the explanation up to this point the transparent type liquid crystal panel 109 has been explained as the element which generates the image data for projection, this is not limitative of the element for generating the image for projection. For example, it would also be acceptable to utilize a reflective type liquid crystal panel or a reflective type DMD (Digital Micromirror Device) element or the like as the pattern creation means for the image for projection. Although normally, if a DMD element is employed, a wheel upon which an R, G, B color filter is fitted is rotated in order to project a color image upon the screen, by using a combination of the above described light source unit 108 and a reflective type DMD, it is possible to implement a projector unit which is compact and moreover is entirely without moving parts.

Figure 2:
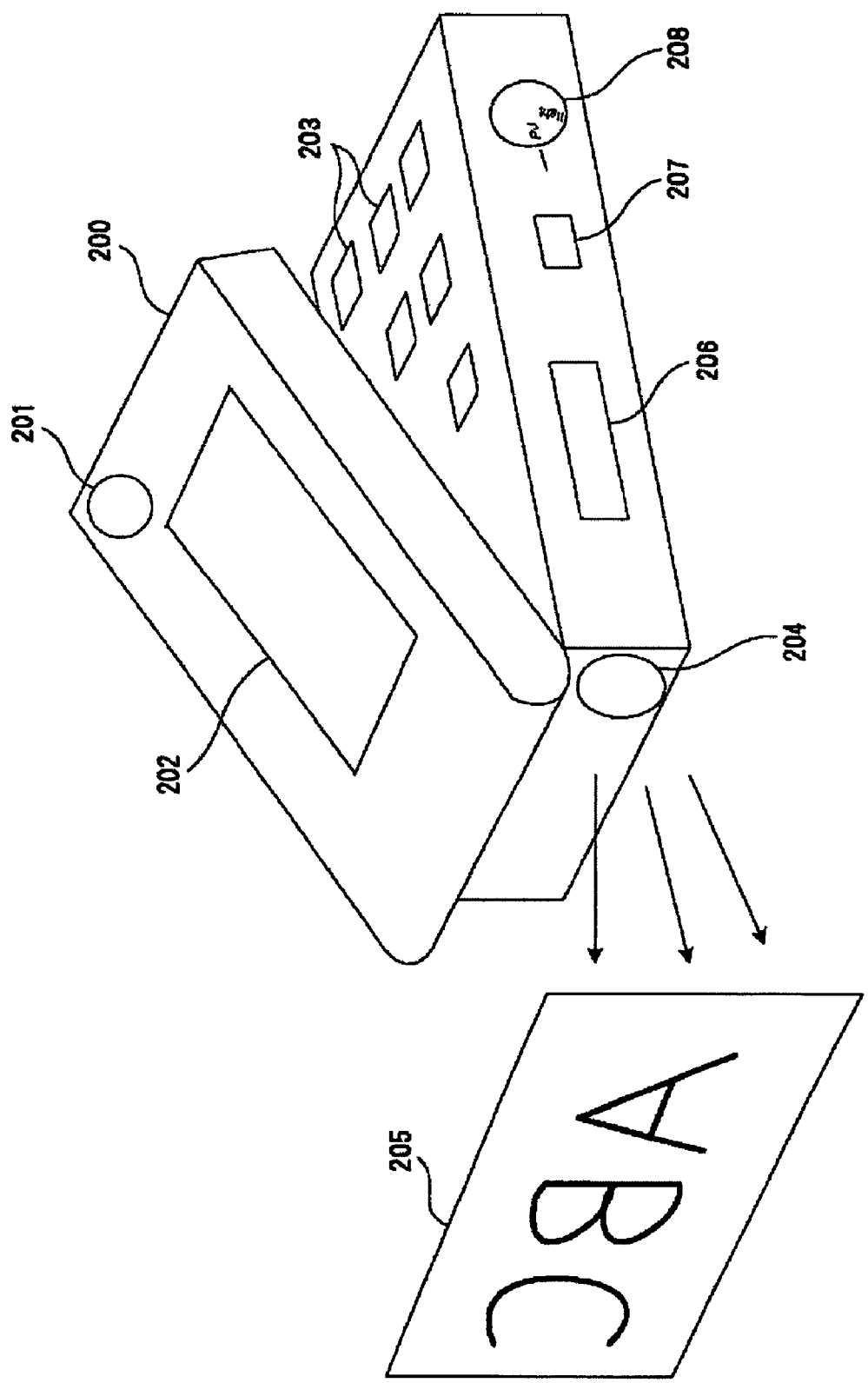
FIG. 2 is a perspective view of this portable telephone equipped with a projector function according to the first embodiment.

In FIG. 2, there is shown in schematic perspective view an example of an operational situation of a portable telephone 200 which is equipped with a projector function. As shown in FIG. 2, this portable telephone 200 is of a so called fold up type construction, in which two chassis 200A, 200B which are shaped as rectangular parallelepipeds are connected together at their one edges by a hinge construction about which they can swing. The portable telephone main body 100 shown in FIG. 1 is contained within these chassis 200A, 200B. On one surface of the upper chassis portion 200A, in other words on the external surface thereof when the portable telephone 200 has been folded up, there are installed a camera for photography 201 and a LCD panel for display 202 upon which character data indicating receipt of email or the like may be checked. The camera for photography 201 corresponds to the photographic lens 101 of the digital camera unit shown in FIG. 1, and the LCD panel for display 202 corresponds to the LCD panel for display 122. Although this matter is not shown in FIG. 2, on the inner surface of the upper chassis portion 200A, in other words on the opposite surface thereof from the side on which the LCD panel for display 202 is installed, there are installed a quite large sized LCD monitor (which corresponds to the LCD monitor 121 of FIG. 1) for displaying image or character data, and a speaker for outputting audio and the like.

Figure 23:
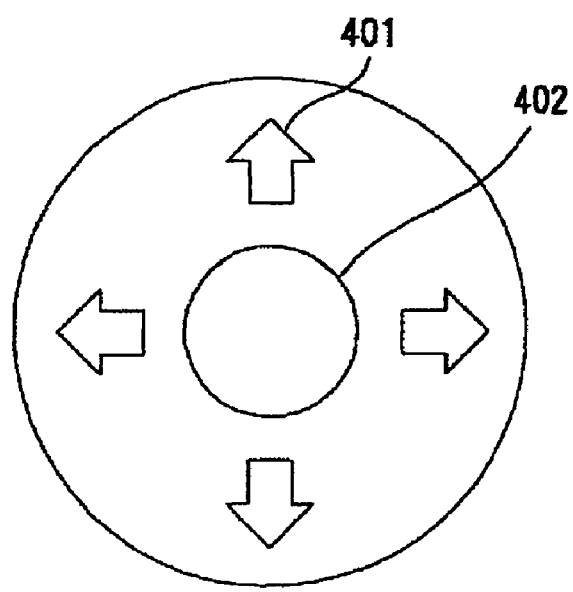
FIG. 23 is a figure for explanation of a four-way key switch which is used in this portable telephone equipped with a projector function.

On the upper surface of the lower chassis portion 200B, in other words on the inner surface thereof when the portable telephone 200 has been folded up, there are disposed actuation buttons 203 including key switches for inputting numerals and characters, a four-way key switch which selects up, down, left and right upon the display screen, and so on, and a microphone for voice input not shown in the figure. This four-way key switch, as shown in FIG. 23, is a compound switch which has four push switches 401 for indicating the four directions up, down, left, and right, and a center push switch 402. When starting of photography by the digital camera unit has been commanded, this center push switch 402 is used as a shutter button.

As shown in FIG. 2, a projector projection lens 204 is provided upon one side of the lower chassis portion 200B. This projector projection lens 204 corresponds to the projection lens 110 shown in FIG. 1, and is positioned so that in, for example, the state in which the portable telephone 200 has been opened up to the maximum limit, in other words when the angle subtended between its upper chassis portion 200A and its lower chassis portion 200B is maximum, the light projected from this projector projection lens 204 is not cut off by the upper chassis portion 200A. FIG. 2 shows the situation when character data is being projected upon a compact screen 205 which is external to the portable telephone 200. This character data which is being projected upon the screen 205 is the same data as displayed upon the LCD panel for display 202. When data is thus being projected upon the screen 205, display is not performed upon the LCD panel for display 202.

On another side of the lower chassis portion 200B, there are installed a memory card insertion slot 206 for insertion of the external storage device (memory card) 107, a projector illumination ON/OFF switch 207, and a selection dial 208 for selecting the operational mode of the projector unit. As will be described hereinafter, this selection dial is actuated by the user, in order to select whether projection operation by the projector unit is being performed at a time when the upper chassis portion 200A is folded up to less than a predetermined angle, or whether only simple illumination operation like that of a pocket electric torch is being performed. The actuation buttons 203, the illumination ON/OFF switch 207, the selection dial 208 and so on correspond to the actuation member 118 shown in FIG. 1.

Figure 3:
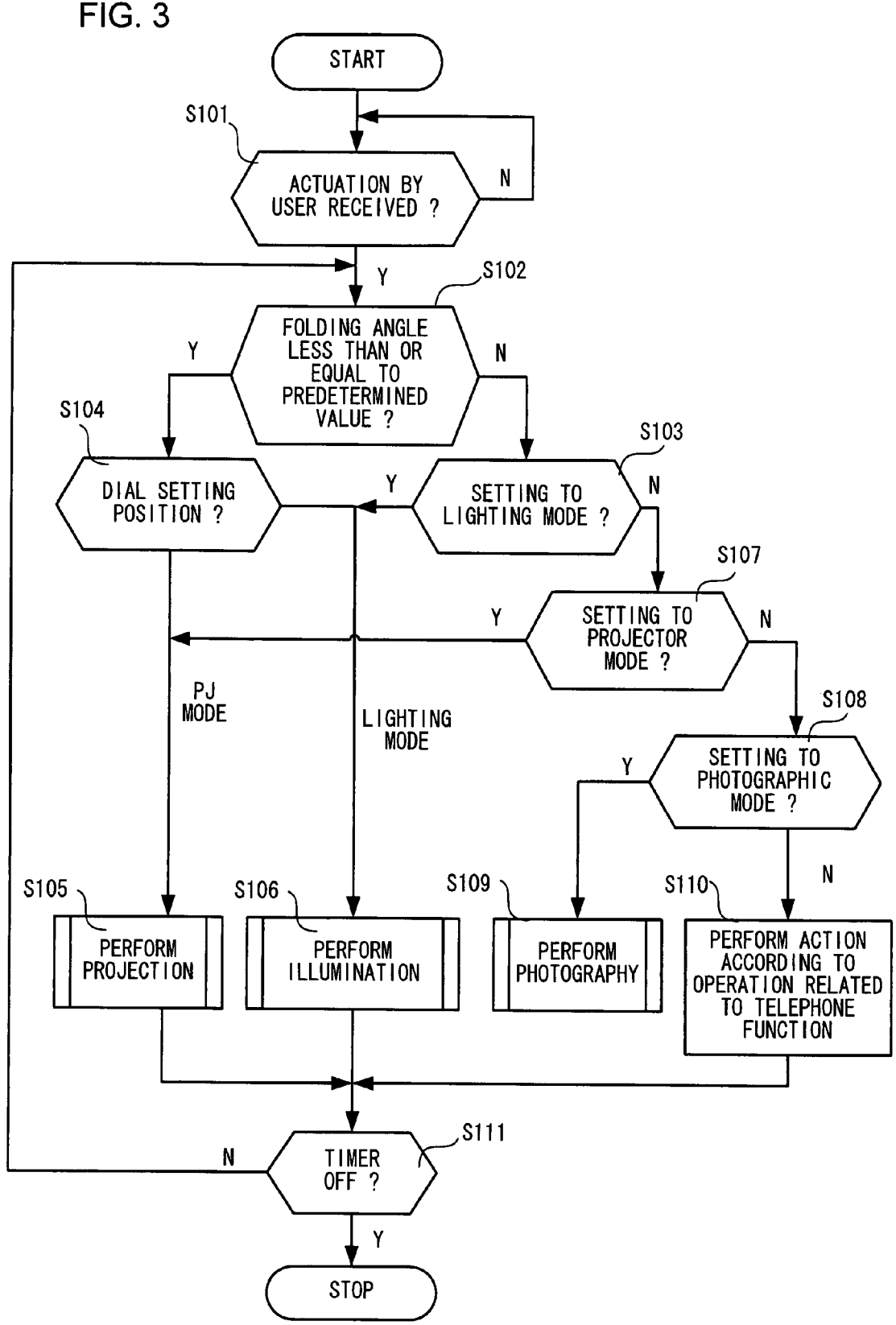
FIG. 3 is a flow chart for explanation of the overall operational sequence of this portable telephone equipped with a projector function according to the first embodiment.

Next, the operation of this portable telephone equipped with a projector function 200 according to the first embodiment will be explained using flow charts of FIGS. 3 through 8. FIG. 3 is a flow chart showing the overall flow of the operation of the portable telephone 200. The series of operations of the portable telephone 200 shown in FIG. 3 is controlled by the CPU 120.

First, in a step S101, when it is detected that some actuation has been performed by the user, or that a telephone call is being received or that an email has arrived, then the system enters its operational mode from its wait mode, and the flow of control proceeds to a step S102. Here, by "some actuation", is meant that the upper chassis portion 200A described above has been opened by the user and/or that he has actuated the actuation member 118.

In the step S102, a decision is made as to whether or not the angle subtended between the upper chassis portion 200A and the lower chassis portion 200B, in other words the angle of inclination, is less than a predetermined angle. Here, an angle of inclination of 0° indicates a state in which the portable telephone 200 is in its closed state and the upper chassis portion 200A and the lower chassis portion 200B are overlapped on one another, while an angle of inclination of 180° indicates a state in which the upper chassis portion 200A has been opened up to the maximum limit in order to perform actuation for conversation or for transmission and reception of email. If the angle of inclination is greater than the predetermined angle, it is decided that the portable telephone 200 is open, and the flow of control proceeds to a step S103. But, if the angle of inclination is less than or equal to the predetermined angle, then it is decided that the portable telephone 200 is closed, and the flow of control proceeds to a step S104.

If it has been decided that the portable telephone 200 is in the closed state, next in the step S104 a decision is made as to the set position of the selection dial 208. If the selection dial 208 is set to a projector mode in order for projection operation with the projector unit to be performed, then the flow of control proceeds to a step S105, and a mode is entered in which projection operation is executed. The sequence of processing in this projection operational mode will be described hereinafter.

On the other hand, if the selection dial 208 is set to a lighting mode in order for illumination operation by the projector unit to be performed, then the flow of control proceeds to a step S106, and a mode is entered in which illumination operation is executed. In this illumination operation, projection of image information upon the external screen 205 is not performed by the projector unit, but rather it simply irradiates light to the exterior of the portable telephone 200 like a pocket electric torch. For example, when performing photographic operation with the digital camera unit, the subject such as a person or the like may be illuminated with light irradiated from the projector projection lens 204.

When executing illumination operation in the step S106, only the power supply to the light source 108 is turned ON, and all of the other power supplies are turned OFF, so that reduction of the amount of consumption of electrical power may be anticipated. The sequence of processing in this irradiation operational mode will be described in detail hereinafter.

It should be understood that the setting of the projector mode or the lighting mode with the selection dial 208 is only effective if the upper chassis portion 200A is closed to less than or equal to the predetermined angle. If the upper chassis portion 200A is open, then the user actuates the actuation buttons 203 and causes a menu related to normal operation (not shown in the figures) to be displayed upon the LCD monitor 121 (refer to FIG. 1), and the setting for projector mode or lighting mode is performed according to various types of mode setting which are set according thereto.

Thus, in the state in which the upper chassis portion 200A is opened, a decision is made in the step S103 as to whether or not setting to the lighting mode is being performed according to the menu screen (not shown in the figures) which is displayed upon the LCD monitor 121. If it is decided that setting to the lighting mode is being performed, then the flow of control proceeds to the step S106, and illumination operation is performed. The illumination operation which is performed here is the same as in the case of setting the lighting mode by the selection dial 208 in the case that the upper chassis portion 200A is closed, as described above. If it is decided that setting to the lighting mode is not being performed, then the flow of control proceeds to a step S107.

In the step S107, a decision is made as to whether or not a setting is being made to the projector mode from the menu screen, in the same manner as in the case of the setting to the lighting mode. If it is decided that a setting to the projector mode is being performed, then the flow of control proceeds to the step S105, and the predetermined projection operation is performed. If it is decided that a setting to projection operation is not being performed, then the flow of control proceeds to a step S108.

In this step S108 a decision is made as to whether or not, according to the menu screen (not shown in the figures) which is displayed upon the LCD monitor 121, setting is being performed to a photographic mode in which photography is to be performed with the digital camera unit. If it is decided that setting to the photographic mode is being performed, then the flow of control proceeds to a step S109. In this step S109, as described hereinafter, a subject is actually photographed with the digital camera unit. If setting is not being performed to the photographic mode, then the flow of control proceeds to a step S110, and normal operation is performed with the portable telephone functional portion. In other words, operation is performed according to user actuation, corresponding to various types of function with which this portable telephone 200 is endowed, such as telephone conversation, email transmission and reception, game play and the like. Of course it is also possible to perform various types of setting, such as adjustment of the sound level, setting of vibration ("manner mode"), photographic image editing, and the like.

In a step S111 the CPU 120 makes a decision as to whether or not a state in which there has been no actuation from the user has been maintained for greater than or equal to a predetermined time period, and if this predetermined time period has not yet elapsed, then the flow of control returns to the step S102. However, if the predetermined time period has elapsed, then the system enters an initial wait mode, and the flow of this routine terminates.

As will be clear from the explanation above, with this portable telephone 200 according to the first embodiment, it is possible to perform projection operation or illumination operation, irrespective of whether or not the upper chassis portion 200A is in the open or the closed state. Furthermore, it is also possible to perform projection operation or illumination operation even in the portable telephone mode with the portable telephone functional portion, or in the photographic mode with the digital camera unit. Due to this, it is possible to implement many types of usage state with this portable telephone 200.

In the following, the projection operation of the step S105, the illumination operation of the step S106, and the photographic operation of the step S109 will each be explained in detail. First, the photographic operation which is executed in the step S109 will be explained using the flow chart of FIG. 4.

With this portable telephone 200 of the first embodiment, before photography, the distance to the subject is calculated by the AF calculation unit 1201, and the photographic lens 101 is driven in order to perform focal point adjustment based upon the result of this calculation. The AF method used here is the contrast method, as previously described. If the contrast of the subject is low, the light irradiated from the projector unit in a specific pattern is irradiated as supplementary AF light, and the AF calculation is then performed based upon the reflected light. Furthermore, when photographing image data for recording, if the luminance of the subject is low, uniform light from the projector unit is employed to illuminate the subject as flash light.

Figure 4:
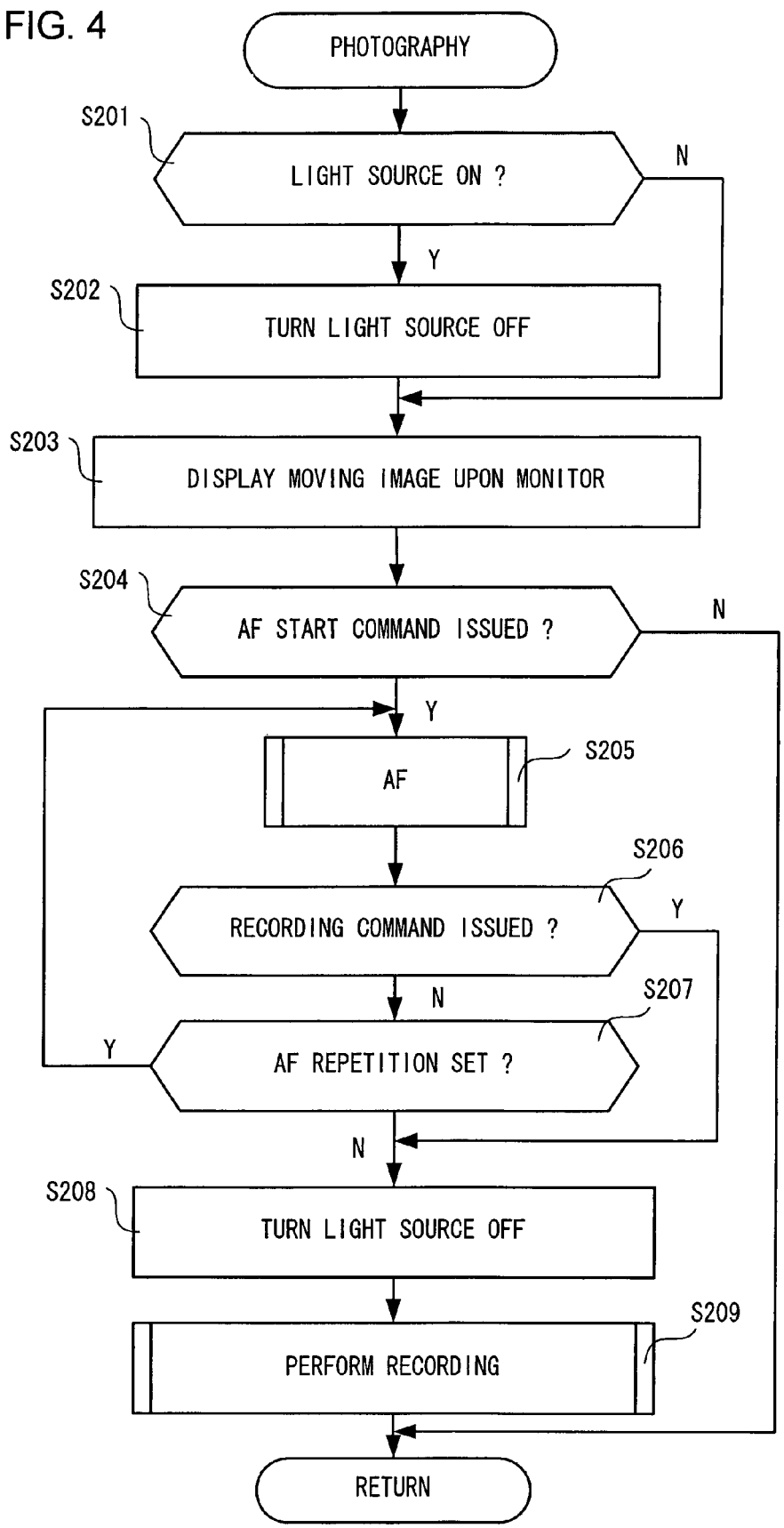
FIG. 4 is a flow chart for explanation of photographic operation of this portable telephone equipped with a projector function.

Thus, in a step S201 of FIG. 4, a decision is made as to whether or not the light source 108 of the projector unit is ON. This is done because sometimes the light source 108 is ON in some other operational mode before entering the photographic mode. If the light source 108 is on, then in a step S202 the light source 108 is turned OFF and the flow of control proceeds to a step S203. But, if the light source 208 is not ON, then the step S202 is skipped and the flow of control proceeds directly to the step S203. It should be understood that, as a different method of checking that the photographic mode has been set, it would also be acceptable to arrange to detect that the projection lens 110 is set to some lens position other than a predetermined position for the projector mode. The details of shifting of the projector lens 110 will be described hereinafter.

In the step S203, the moving image which is captured by the photographic camera 201 is displayed upon the LCD monitor 121 as a so-called through image. Then in a step S204 a decision is made as to whether or not a command for starting AF operation has been issued. Such a command for starting AF operation is issued by pushing once upon the center push switch 402 of the four-way key which is installed to the lower chassis portion 200B. If no such start command has been issued, this routine is terminated, while if a start command has been issued, then the flow of control proceeds to a step S205, and AF calculation is performed by the AF calculation unit 1201. The details of this AF calculation executed in the step S205 will be described hereinafter.

Then in a step S206 a decision is made as to whether or not a command has been issued to record the photographic image upon the memory card 107. This recording command is issued by pushing upon the center push switch 402 of the four-way key again. If such a recording command has been issued then the flow of control proceeds to a step S208, while if no recording command has been issued, then the flow of control proceeds to a step S207. In this step S207 it is determined as to whether or not repeated performance of the AF calculation is set.

Normally, with a digital camera, it is possible to set either a single AF mode in which focusing upon the subject is performed once only and then the AF operation is stopped at this point, or a continuous AF mode in which the movement of the subject is tracked continuously and AF operation is repeated. It is also possible to perform the same setting with the portable telephone 200 according to the first embodiment. For this setting, an AF mode setting menu (not shown in the figures) is caused to be displayed upon the LCD monitor 121 by actuating the actuation buttons 203, and the user makes the setting by actuating the actuation buttons 203 according to this menu which has been displayed. If it has been set to perform repeated AF, then the flow of control returns to the step S205; while, if it has been set not to perform repeated AF, then the flow of control proceeds to the step S208.

In this step S208, the light source 108 is turned OFF if supplementary AF light was radiated during the AF calculation, and next recording upon the memory card is performed in a step S209. This terminates the processing for the photographic operation. The details of the recording operation which is performed in the step S209 will also be described hereinafter.

As explained above, with this portable telephone 200 according to the first embodiment, the AF start command and the recording start command are issued by pressing the center push switch 402 of the four-way key twice. Instead of this, it would also be acceptable to build the portable telephone 200 so as to be provided with a separate shutter button of the same type as the shutter button of a normal camera. With such a shutter button, AF calculation is started by so-called a half press in which the shutter button is pressed halfway down, while the recording start command is issued by pressing it down deeper, in other words with a full press.

Figure 5:
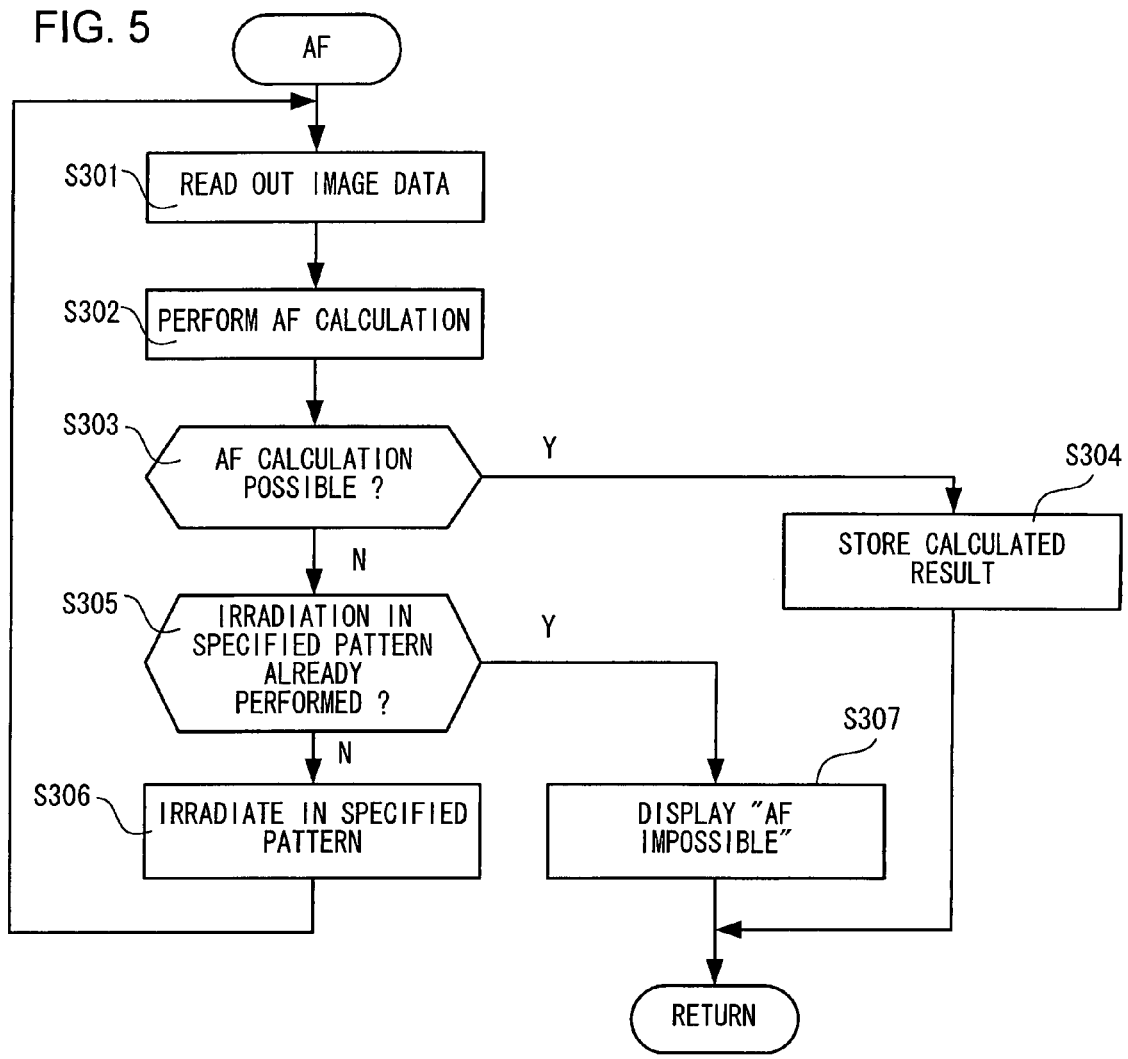
FIG. 5 is a flow chart for explanation of AF operation of this portable telephone equipped with a projector function.

Next, the AF operation which is executed in the step S205 of FIG. 4 will be explained using FIG. 5. In a step S301, image data is read out from the image sensor 103, and then in a step S302 AF calculation is performed by the AF calculation unit 1201. For this AF calculation, the image data which was read out from the image sensor 103 so as to display moving image (through image) upon the LCD monitor 121 in the step S203 is used.

Then in a step S303 a decision is made as to whether or not AF calculation is possible. In concrete terms, a decision is made that AF calculation is impossible if, based upon the result of AF calculation in the step S302, the contrast of the subject is too low. Furthermore, since AF calculation also becomes impossible if the luminance of the subject is too low, accordingly it would also be acceptable, in addition to the decision according to the result of the AF calculation, to detect the luminance of the subject, and to decide whether or not AF calculation is possible by also taking the result of this luminance detection into account. In other words, it would be possible to decide that AF calculation is impossible, if the luminance of the subject is less than or equal to some predetermined value. Directly after the AF calculation, the AF calculation unit 1201 decides whether or not AF calculation is possible. If it is decided that AF calculation is possible then the flow of control proceeds to a step S304, while if it is decided that AF calculation is impossible then the flow of control proceeds to a step S305.

In the step S304, along with storing the AF calculation result which has been calculated in the step S302 in the storage unit 1202 of the CPU 120, the photographic lens 101 is driven, and then this routine related to AF operation terminates.

In the step S305, a decision is made as to whether or not irradiation light of the specified pattern has already been irradiated from the projector unit as supplementary AF light. If it has been decided that AF calculation is impossible irrespective of whether irradiation light of the specified pattern has already been irradiated, then the flow of control proceeds to a step S307. However, if irradiation light of the specified pattern has not yet been irradiated, then the flow of control proceeds to a step S306, and irradiation light of the specified pattern is irradiated as supplementary AF light. As the supplementary AF light for performing focal point detection during the AF control, a straight line pattern which slopes across the photographic frame is suitable. The illumination pattern for the illumination light which is used as supplementary AF light is different from the illumination pattern of the illumination light which is used as flash light.

Figure 14:
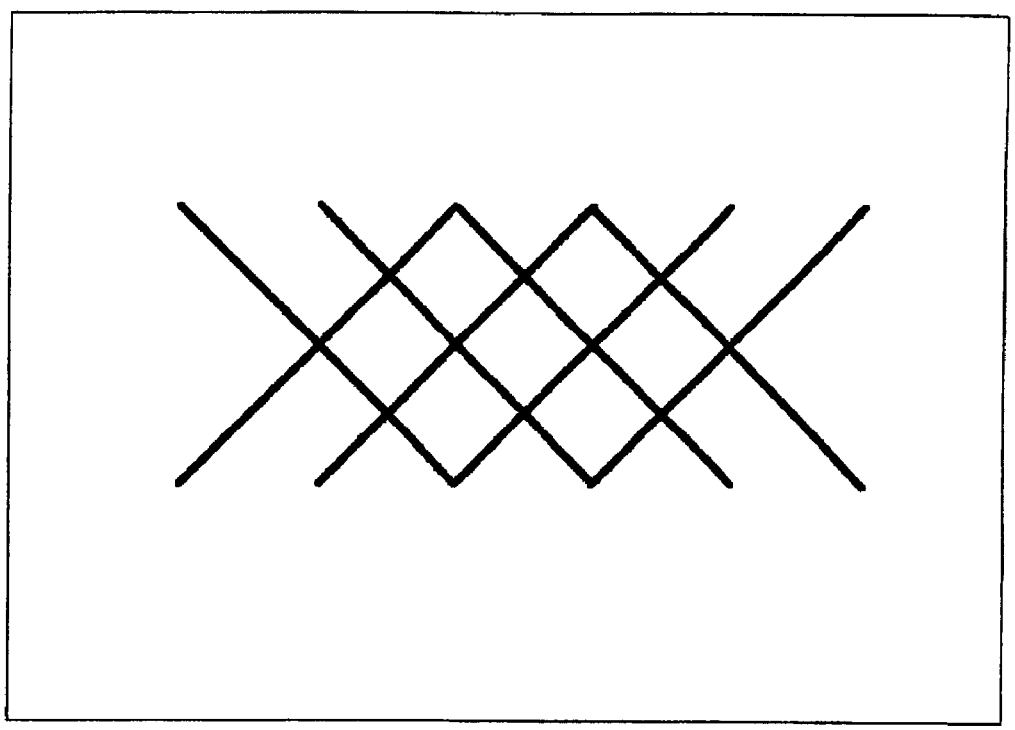
FIG. 14 is a figure for explanation of a specific pattern of providing irradiation as supplementary AF light in this portable telephone equipped with a projector function.

In FIG. 14, an example of a specific pattern which is suitable for the supplementary AF light is shown. A pattern for projection is formed upon the LCD panel for projection 109 in order to implement irradiation light of the specific pattern as shown in FIG. 14. By doing this, irradiation light in the form of a sloping lattice as shown in FIG. 14 is irradiated by the projector unit upon the subject. After this irradiation light of the specific pattern has been irradiated upon the subject as the supplementary AF light, the flow of control returns to the step S301 and the AF calculation processing is performed again.

If AF calculation is impossible irrespective of whether irradiation light of the specific pattern has already been irradiated, then it is considered to be the case that the subject is too far away from the camera for photography 201, or conversely that it is too close thereto. Thus, in the step S307, along with performing display upon the LCD monitor 121 or the like to show that AF is impossible, also the photographic lens 101 is driven to a focal point position such as for achieving pan focus or the like, and then this routine is terminated. It should be understood that, since sometimes it may happen that the subject shifts and AF becomes possible, accordingly it will be acceptable to display a display that AF is impossible for only the minimum time period in which it can be recognized.

Figure 6:
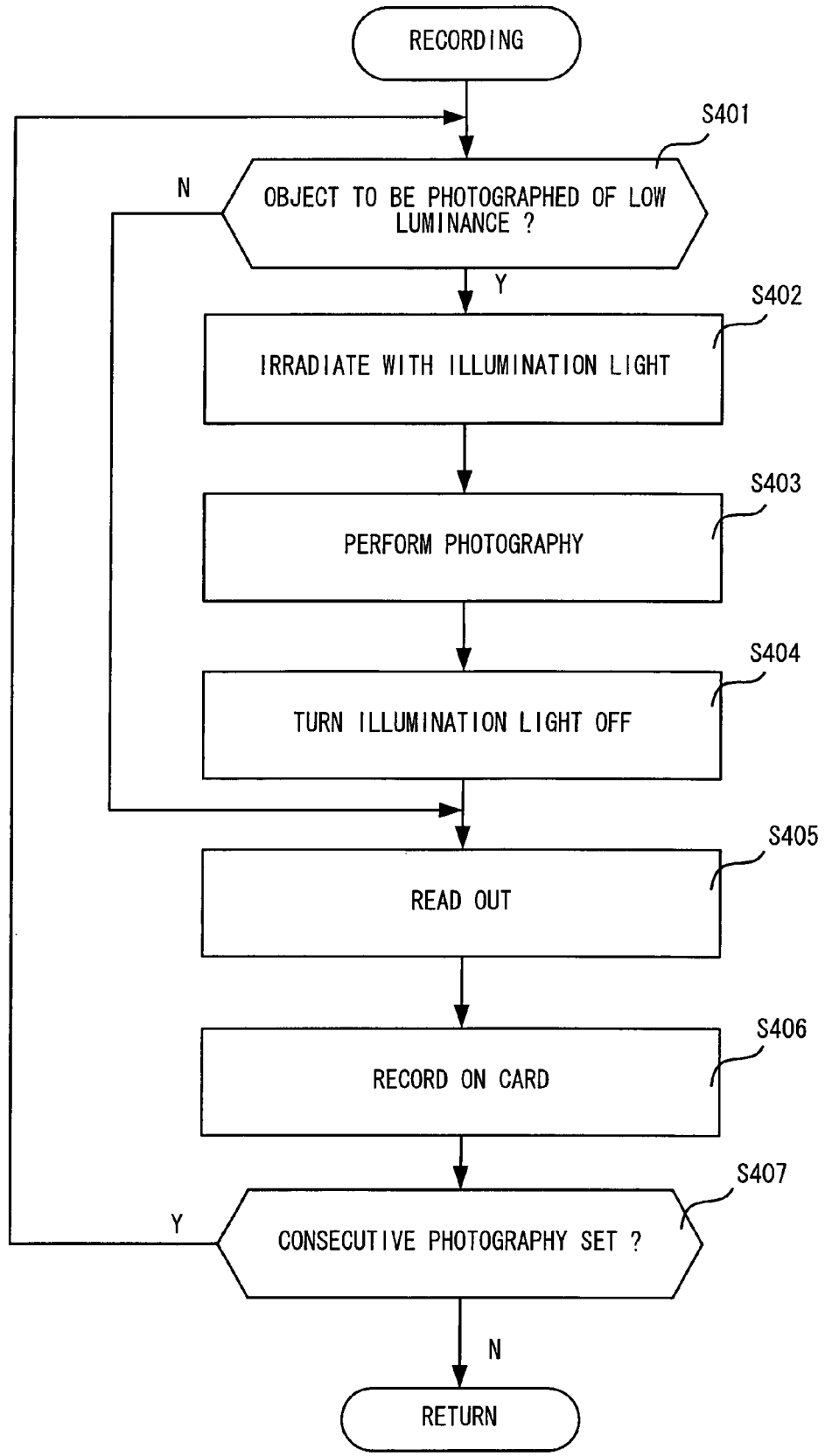
FIG. 6 is a flow chart for explanation of recording operation of this portable telephone equipped with a projector function.

It should be understood that, in the flow chart shown in FIG. 6, when recording of an image is commanded via the center push switch 402 or the like, an image of the subject is photographed by the image sensor 103, and the data for this photographic image is recorded upon the memory card 107. However, this should not be considered as limitative; for example, it would also be acceptable to arrange for this image to be recorded upon the memory card 107 when, after the still image which has been photographed of the subject has been displayed upon the LCD monitor 121, a command is issued by the user to record this still image which has been displayed.

Next, the recording operation which is executed in the step S209 of FIG. 4 will be explained using FIG. 6. When a recording command has been issued by pressing the center push switch 402 of the four-way key twice as previously described, or by pressing a shutter button (not shown in the figures), then in a step S401 a decision is made as to the luminance of the subject. The CPU 120 detects the luminance of the subject based upon the through image which is displayed upon the monitor. If it is decided that the luminance of the subject is greater than or equal to a predetermined value and accordingly is sufficient, then the subject is photographed with the image sensor 103, and then the flow of control proceeds to a step S405. On the other hand, if it is decided that the luminance of the subject is lower than the predetermined value, then the flow of control proceeds to a step S402.

In this step S402, illumination light which is generated by the projector unit is irradiated as flash light from the projector projection lens 204 upon the subject. At this time, the LEDs which are used in the light source 108 are caused to emit light at their maximum luminance for the exposure time period, in other words for the same time period as the electrical charge storage time period of the image sensor 203. It should be understood that it would also be acceptable to arrange to adjust the light emitting luminance or the light emission time period of the LEDs, according to the distance from the photographic camera 201 to the subject, based upon the result of the AF calculation which was performed in the step S205. By doing this, faces are prevented from being white-clipped by the flash light due to the object which is being photographed being too close; in other words, faces in the image which is being photographed are prevented from becoming too bright. And then, in a step S403, the subject which has thus been illuminated with the flashlight irradiated from the projector projection lens 204 is photographed with the image sensor. And then in a step S404 the flash light is turned OFF.

In the step S405 the image data is read out from the image sensor 103. And then in a step S406 predetermined processing is performed by the signal processing circuit 105 upon the image data which has been read out, and the resulting data is recorded upon the memory card 107.

In a step S407 a decision is made as to whether or not the consecutive photography mode is set. If the consecutive photography mode is not set then this recording routine is terminated, while, if it is set, then the flow of control returns to the step S401 and photography is repeated until the recording command is cancelled. Here if, during consecutive photography, the continuous AF mode is set in which AF is made to track the movement of the subject, then return is performed not to the step S401, but to the step S205 of FIG. 4. In other words, during the consecutive photography mode setting, AF operation is performed using the image data which was outputted from the image sensor 103 for recording upon the memory card 107 in the step S405. Since, if the subject was of low luminance, this image data is data which was obtained by irradiating it with flash light, accordingly it is possible to perform the AF calculation accurately.

Now, the illumination color of the flash light which is irradiated upon the subject as described in the step S402 will be explained. Since, in this projector unit according to the first embodiment, it is possible to use, for the light source 108, not only white colored LEDs, but also LEDS which have different light emission colors such as red, blue, green, yellow, and so on, accordingly, when irradiating light from the projector unit, it is possible to illuminate the subject while selecting the light emission color. Furthermore, the light illumination color is not limited to being the light emission color of a single LED considered in isolation; it is possible to produce illumination light of any desired color by varying the light emitting intensity between the LEDs of different light emission colors. Of course it is also possible to vary the amount of irradiation light by varying the light emitting intensity of simple white colored LEDs. By doing this, it becomes possible for the user to select the desired light emission color, and to perform photography while obtaining various kinds of beneficial effect, such as the effect of the object being illuminated by the setting sun, or of adjusting only the subject to sepia coloration, or the like.

Furthermore, when performing this irradiation of flash light with the projector unit, it is also possible to obtain unique photographic effects by setting various types of pattern for illumination upon the LCD panel for projection 109. As examples of such patterns for illumination, only one portion within the photographic angle of view may be illuminated, or only part of the upper, lower, left, and right portions within the screen may be illuminated brightly, with the other portions gradually becoming dark. Here, the various types of pattern for illumination to be created upon the LCD panel for projection 109 are set in advance as being patterns which are different from the patterns for projection when externally projecting the image which is displayed upon the LCD monitor 121 or the like. The user is able to cause a menu for setting the flash light to be displayed upon the LCD monitor 121 by actuating the actuation buttons 203 or the like, and is able to select a flash light for obtaining any desired special beneficial effect from upon this menu which is displayed.

In FIG. 24, there is shown an example of a menu for flash light setting to be displayed upon the display screen of the LCD monitor 121. Upon this menu for flash light setting, it is possible to perform setting of the color of the illumination light which is to be irradiated upon the subject, setting of the illumination area upon which the illumination light is to be irradiated, and halftone setting of the illumination luminance at the boundary portions between the area to be illuminated and other areas, in other words setting of whether or not to provide intermediate luminance at these portions. Here, by intermediate luminance of the illumination light, is meant that the illumination luminance or the irradiation light amount changes gradually, in other words stepwise, at the change over portions between the illumination area and other areas. In FIG. 24, it is shown that "white color", "all over", and "none" surrounded with square frames are being selected. These are shown as being the default settings.

It should be understood that although, in FIG. 24, in the item "1. Illumination Color Setting", settings for any one of the pure colors R, G, B, and Y are shown by way of example, it would also be acceptable to arrange for it to be possible to set adjustment of these intermediate colors by making it possible to select the light emitting intensity of the LEDs of the various light emission colors, or a plurality of the LEDs, at the same time. Moreover, it should be understood that, when setting the illumination area to be irradiated with illumination light, a pattern for illumination may be created upon the LCD panel for projection 109 so that the amount of illumination light which is irradiated upon the illumination area becomes greater than the amount of illumination light which is irradiated upon other areas.

Furthermore it would also be acceptable to arrange that, during irradiation of the flash light with the projector unit, the focal point distance of the projection lens 110 is set based upon the result of the AF calculation performed in the step S205. By doing this, it would become possible to perform optimum illumination of the subject, according to the intentions of the user.

When the illumination by the projector unit has been turned OFF, it is possible to anticipate reduction of the electrical power consumption by, in the various routines explained above for photographic operation (refer to FIG. 4) and for recording operation (refer to FIG. 6), turning OFF the power supply to the LCD panel for projection 109 and all of the other necessary circuitry for operation of the projector unit.

Next, the projection operation which is executed in the step S105 of FIG. 3 will be explained using the flow chart of FIG. 7. This projection operation is operation when the projector unit which is housed within the portable telephone 200 functions as a normal projector. In this projection operation, the data which is projected externally when the upper chassis portion 200A is closed is different from when it is opened. Thus first, in a step S501, a decision is made as to whether or not the angle which is subtended by the upper chassis portion 200A and the lower chassis portion 200B is less than or equal to a predetermined angle. Here, the value detected by the angle detector 119 described previously is used. If it is decided that the angle of inclination is greater than the predetermined angle so that it has been decided that the portable telephone 200 is in the opened state, then the flow of control proceeds to a step S502, while if it is less than or equal to the predetermined angle so that it is decided that the portable telephone 200 is in the closed state, then the flow of control proceeds to a step S505.

In the step S502, a decision is made as to whether or not the illumination light by the projector unit is already ON. If the illumination light is ON, the flow of control proceeds to a step S504. However, if the illumination light is not ON, then the flow of control proceeds to a step S503 and, after turning the light source 108 ON, the flow of control proceeds to the step S504. In this step S504, the driver 113 is driven by a control signal from the CPU 120, and an image for projection data having the same contents as the contents being displayed upon the LCD monitor 121 is created upon the LCD panel for projection 109, so that this image data is projected upon the screen 111. Having done this, this operation in the projection mode terminates.

During this projection operation, it is possible to anticipate reduction of the electrical power consumption by, along with turning OFF the power supply of the LCD monitor 121, also turning OFF the power supply to all of the necessary circuitry related to photography. These operations are set so as to be performed automatically when the portable telephone enters its projection operational mode. Furthermore, it would also be acceptable to arrange for the LCD monitor 121 to be turned ON and OFF manually. Moreover, if it is configured that it should be possible to project with the projector unit a photographic image which has been photographed by the digital camera unit, then the power supply to the circuitry related to photography should be left ON just as it is.

If the upper chassis portion 200A is folded up, in the step S505, a decision is made as to whether or not the illumination light due to the projector unit is ON. If the upper chassis portion 200A is folded up, then the contrary processing is performed to that in the step S502 when it is opened. In other words, if the illumination light is OFF then the flow of control proceeds to a step S507 without any action, while if the illumination light is ON then the flow of control proceeds to a step S506 and, after turning the illumination light OFF, the flow of control proceeds to the step S507.

In this step S507, it is determined whether or not a signal such as a telephone call or an email or the like is incoming. If it is determined than no such incoming signal is present then the flow of control proceeds to a step S510, while if it is decided that an incoming signal is present then the flow of control proceeds to a step S508. In this step S508, the illumination light is put ON by turning the light source 108 ON, so that a projection image which shows that a telephone call or an email has arrived is displayed by being projected upon the screen 111. At this time, the LCD panel for display 122 is turned OFF. Of course, it would also be acceptable to perform a setting so that the LCD panel for display 122 was also ON at the same time.

If any type of incoming signal to the portable telephone 200 is present, then normally the user opens the upper chassis portion 200A, and actuates the actuation buttons 203 to perform checking of the telephone call or the email. Thus, in the step S510, a decision is made as to whether or not the user has performed any type of actuation upon the portable telephone 200. For example, if the user has opened the upper chassis portion 200A, in other words if it is detected by the angle detector 119 that the angle between the upper chassis portion 200A and the lower chassis portion 200B is greater than the predetermined value, then the flow of control proceeds to the step S512; while, if the upper chassis portion 200A is not opened and remains still closed, then the flow of control proceeds to the step S511.

In this step S511, a decision is made as to the time which has elapsed after the arrival of the incoming signal was detected in the step S507. If the elapsed time from signal arrival is within a predetermined time period then the flow of control returns to the step S509, and the projection of a display for signal arrival is continued. It is more effective to notify the arrival of an incoming signal to the user by audio notification with a buzzer or the like, not shown in the figures. If the user does not perform any actuation upon the portable telephone 200 even though a time greater than or equal to the predetermined time period elapses, then the flow of control proceeds to a step S512. In this step S512, the illumination light of the projector unit is turned OFF and projection display is terminated. By doing this, the projection operation upon the arrival of an incoming signal to the portable telephone 200 ends.

Next, the illumination operation which is executed in the step S106 of FIG. 3 will be explained using FIG. 8. During this illumination operation, as bright an illumination light as possible is irradiated from the light source 108 to the exterior of the portable telephone 200. Thus, if the LCD panel for projection 109 can be retracted from the optical path, the irradiation light irradiated from the projector unit at the maximum amount to the exterior, for example upon a subject, will be brighter.

Thus, in a step S601, a decision is made as to whether or not the LCD panel for projection 109 is retracted from the optical path for projection, in other words from the optical path of the light being outputted from the light source 108. If it is decided based upon the value detected by the position detector 116 that the LCD panel for projection 109 is retracted from the optical path, then the flow of control proceeds to a step S603. But if it is decided that the panel is not retracted, then the flow of control proceeds to a step S602, in which the LCD panel for projection 109 is retracted from the optical path for projection, in order to take most effective advantage of the illumination light from the light source 108. For example the LCD panel for projection 109 is shifted by driving a motor or the like provided to the driver 113, so that it is retracted from the optical path of the light irradiated from the light source 108. Simultaneously with this, the power supply to all of the circuitry is turned OFF, except for that circuitry which is necessary for putting the light source 108 ON.

It should be understood that if, during the photographic mode or the portable telephone mode described previously, illumination light is to be irradiated to the exterior, or the like, then it is necessary to change over smoothly to the lighting mode. Accordingly it is better, while changing over to the lighting mode, to perform illumination operation without retracting the LCD panel for projection 109. Thus, the transmittivity of the LCD panel for projection 109 is set to the maximum by driving the driver 113, so that the irradiation light amount is as great as possible. Furthermore, by making it possible to vary the light emission amount of the light source 108, it becomes possible to reduce the illumination light amount, thus extending the irradiation time period to a certain moderate amount. Moreover, in the same manner as in the case of emitting flash light during photographic operation as described above, if a plurality of LEDs which have different light emission colors are used for the light source 108, by varying the light emitting intensity of the LEDs which have different light emission colors from white, it becomes possible to provide illumination of various types of light emission color. Yet further, it is also possible to employ the illumination operation by the projector unit as an assistance function during photography, by forming a type of projection pattern upon the LCD panel for projection 109 which illuminates only a portion of the area within the angle of view. This function will be described in detail hereinafter.

In the step S603 it is decided whether or not the light source 108 is ON. If the light source 108 is ON then the flow of control proceeds to a step S606, while if it is OFF then the flow of control proceeds to a step S604. In this step S604 a decision is made as to whether or not an illumination ON command is being issued, by referring to the illumination ON/OFF switch 207 (refer to FIG. 2). If an illumination ON command is not being outputted then this routine terminates, while if an illumination ON command is being outputted then the flow of control proceeds to a step S605. In this step S605 the light source 108 is turned ON so that the illumination light goes ON. Thereafter in the step S606 a decision is made as to whether or not a command to turn the illumination light OFF is being issued by the illumination ON/OFF switch 207. If no such illumination OFF command is being issued then this routine terminates while continuing irradiation by the illumination light just as it is, whereas if a command to turn the illumination light OFF is being issued then the flow of control proceeds to a step S607, in which the illumination is turned OFF, and then this routine terminates.

As explained above, by performing illumination operation with the projector unit, it is possible to use the portable telephone 200 as a pocket electric torch, for example to illuminate a subject more clearly. However, this illumination operation is not limited to the case in which a setting is made to the lighting mode with the selection dial 208 in the state in which the upper chassis portion 200A is folded up. For example, in the photographic operation processing of the step S109 shown in FIG. 3, it may also be contemplated to perform illumination operation with the projector unit, when the photographic field of view and the subject are being displayed with the LCD monitor 121 before photography, in a case such as when it is desired to check the subject in a more brightly illuminated state. Or it is also possible to implement a photographic assistance function with the illumination operation, in order to perform photography more effectively. It is possible to implement such photographic assistance easily and simply by issuing an ON command for the illumination light, using the illumination ON/OFF switch 207.

It should be understood that, during the photographic operation described above, the subject is irradiated by the projector unit only momentarily over a short time period with flash light whose light emission luminance is high. However, when the illumination light from the projector unit is used for photographic assistance, the illumination light is irradiated upon the subject continuously.

Figure 15:
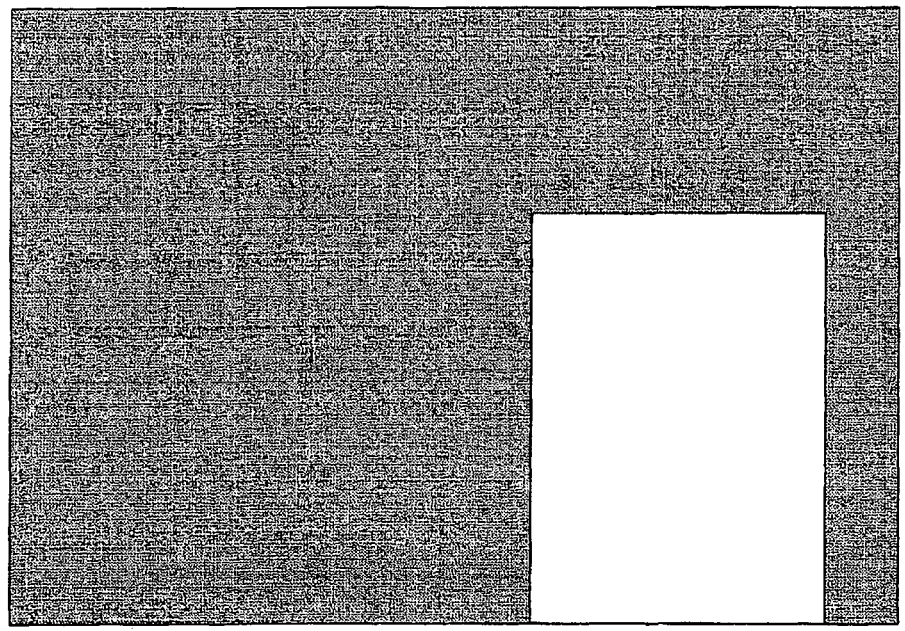
FIG. 15 is a figure for explanation of a range of illumination when assisting photography with this portable telephone equipped with a projector function.

An example of this photographic assistance function by illumination operation will now be explained using FIGS. 15 and 16. FIG. 15 shows an illumination range when, within the photographic frame which is photographed by the digital camera unit, it is desired to take a photograph in which the main subject is disposed at the lower right of the frame. The white portion in FIG. 15 shows the range which is illuminated by the illumination light from the light source 108. At this time, a projection pattern is generated upon the LCD panel for projection 109, such that the transmittivity of the portion shown as white in FIG. 15 is high as compared to the portions around it. In this manner, by illuminating only the lower right portion within the range which is photographed by the digital camera unit, it is possible reliably to inform the user of the position of the main subject.

Furthermore it is also possible to set an AF area, so that AF control is performed with respect to a subject which is present within a portion upon which the illumination light is illuminated. By doing this it is possible to prevent focusing being performed mistakenly to the central portion, irrespective of the fact that the center of the main subject is at a position which is deviated from the center, which would be undesirable. In FIG. 15, although setting is performed so as to irradiate the illumination light at the lower right portion within the photographic frame, it would also be acceptable to arrange to perform setting so as to irradiate the illumination light at the lower left portion of the photographic frame. Furthermore, it is also possible to perform setting so as to irradiate the illumination light at a plurality of regions within the photographic frame, as shown in FIG. 16. By creating a projection pattern of the type shown in FIG. 16 upon the LCD panel for projection 109 and irradiating the illumination light therethrough, it is possible to implement an effective assistance function when two main objects to be photographed are present. By the objects to be photographed being disposed so as to be at positions which are illuminated in this manner, and by setting the AF area to these portions where the illumination light is irradiated, it is possible to prevent so called central picking in which, at the very center of the frame where the main objects to be photographed are not present, the focus is adjusted to long distance.

Figure 16:
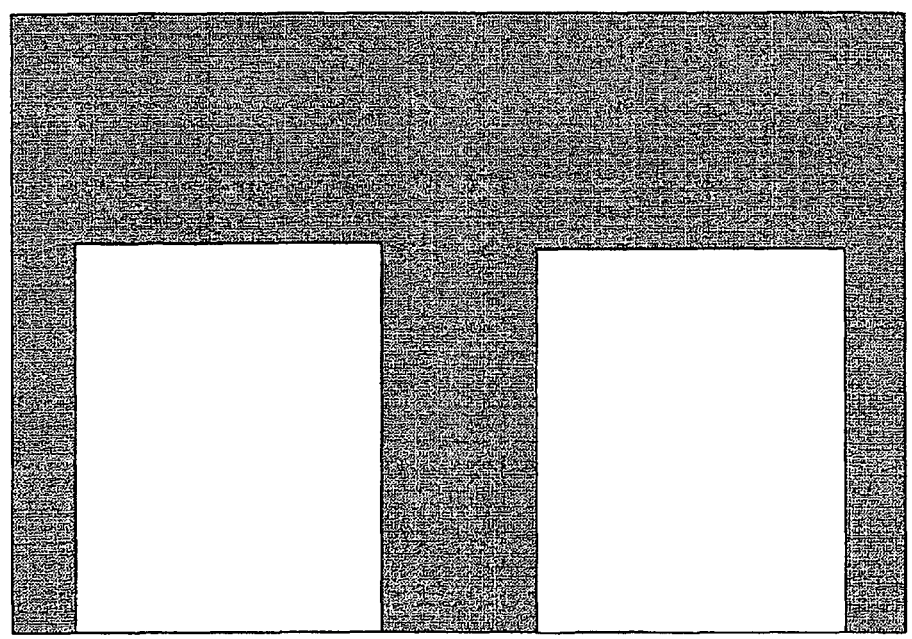
FIG. 16 is a figure for explanation of another range of illumination when assisting photography with this portable telephone equipped with a projector function according to the present invention.

The illumination patterns shown in FIGS. 15 and 16 are preferred when it is desired to photograph a person who is quite large within the frame, such as in the case of a bust shot or the like. Apart from this it is also possible, for example, to set the illumination pattern so as to illuminate a region which corresponds to an AF area which has been set in advance. By doing this, it is possible for the user to check an already set AF area with the illumination light which is irradiated upon the subject. Or it is also possible to illuminate only an area which is AF locked, as a result of AF calculation. By doing this, the photographer is able to confirm the area upon which focusing is performed.

It should be understood that it would also be acceptable to obtain special beneficial effects by varying the illumination color in the case of performing illumination operation as an assistance function during photography, in the same manner as when irradiating flash light during photographic operation as previously described. Since it is also possible to illuminate the entire frame uniformly with the illumination light from the light source 108, rather than only part of the photographic frame as shown in FIGS. 15 and 16, accordingly it is possible to check the angle of field before photography when, for example, the photographic frame is dark. Setting of the illumination pattern of the illumination light when using the illumination light as an assistance function during photographic operation, i.e. setting of the pattern for illumination which is created upon the LCD panel for projection 109, the illumination color, and illumination strength and so on, can be performed from a menu setting screen (not shown in the figures) before photography, by the user actuating the actuation buttons 203 or the like.

Apart from this, it is possible to employ the projector unit as a simple illumination means during the operation of the portable telephone functional portion, or when data for projection is being projected to the exterior. For example, if the user thinks that he wants to illuminate some object during a conversation upon the portable telephone 200, he is able to illuminate that object by utilizing the portable telephone 200 directly like a pocket electric torch by turning the illumination ON/OFF switch 207 to ON. Furthermore, if the user thinks that he wants to illuminate some object while displaying the contents of the LCD monitor 121 or the contents of the LCD panel for display 122 as data for projection, then, by issuing an ON command with the illumination ON/OFF switch 207, he can shine illumination of high luminance to the exterior in a simple manner, without any relationship to the display which was being previously projected.

The projector unit which is fitted to the portable telephone 200 according to the first embodiment explained above is provided with the ultra-compact light emission unit 108 and the image generation unit 109, and moreover the projection distance to the screen 111 is also short. Since, due to this, it is possible to make the volume of the entire projector unit as an extremely compact shape, accordingly it is possible to anticipate that this portable telephone 200 with incorporated projector unit can be made more compact.

Second Embodiment

Now, a portable type information device according to a second embodiment of the present invention will be described in the following. In this second embodiment, in order to make the projector unit which is mounted to the portable type information device, for example a portable telephone, even more compact than in the first embodiment, the position of some of the structural elements is changed during operation of the projector unit, and during non-operation thereof.

Figure 17:
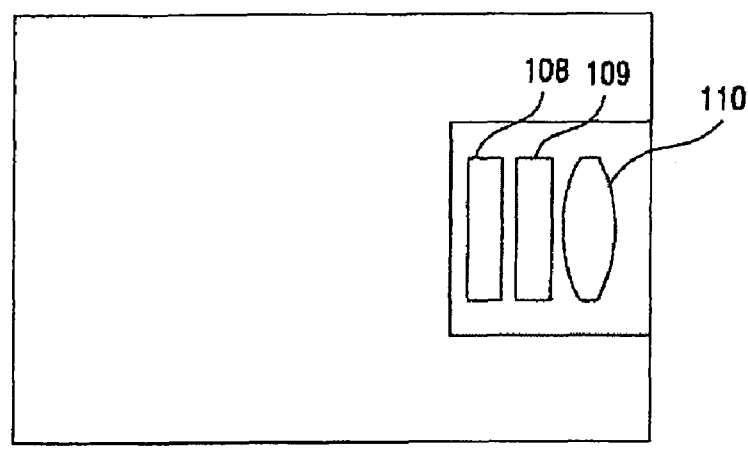
FIG. 17 is a figure for explanation of a situation when storing a projector unit of a portable telephone equipped with a projector function according to the second embodiment.

In FIG. 17, there is shown the arrangement during non-operation of the projector unit mounted in the portable telephone 200, in other words during the stored state. It should be understood that the structure of the digital camera unit and the portable telephone functional portion which are provided to the portable telephone 200 is the same as in the first embodiment described above, and accordingly the description thereof will be curtailed. As shown in FIG. 17, the gaps between the various structural elements such as the light source 108, the LCD panel for projection 109, and the projection lens 110 is included in the projector unit are narrowed down as much as possible, so that the entire projector unit can be stored perfectly within the chassis of the portable telephone 200.

Figure 18:
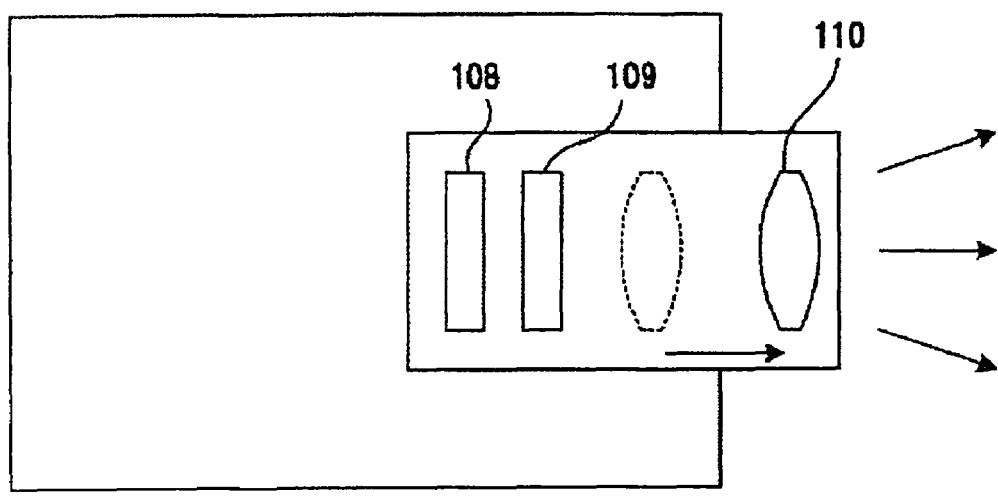
FIG. 18 is a figure for explanation of a situation during illumination operation by the projector unit shown in FIG. 17.

FIG. 18 shows the arrangement during the operation of the projector unit of the portable telephone 200. When the projector unit is performing projection operation, by pulling the projection lens 110 out to the exterior from the chassis of the portable telephone 200, it is possible to project the data for projection upon the screen 111 at a predetermined size. The projection lens 110 is shifted by the driver 114 shown in FIG. 1. It should be understood that it would also be acceptable to provide a construction with which, during this projection operation, in addition to shifting of the projection lens 110, also the gap between the light source 108 and the LCD panel for projection 109 is increased so as to be greater than during storage.

Figure 19:
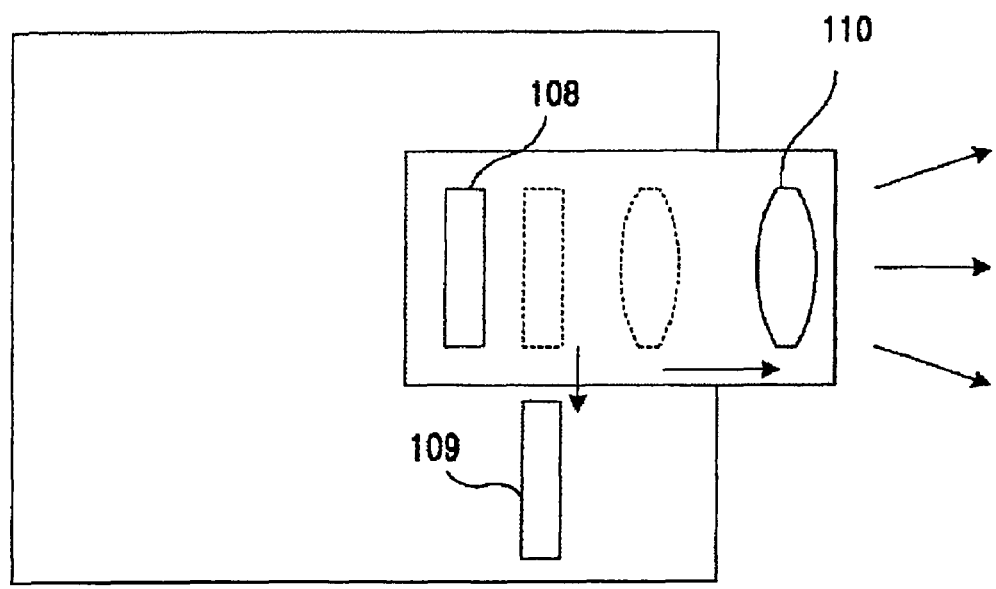
FIG. 19 is a figure for explanation of a situation when an LCD panel of the projector unit shown in FIG. 17 has been retracted.

And FIG. 19 shows the arrangement when the lighting mode is set, and illumination operation is being performed by the projector unit. During this lighting mode setting, along with retracting the LCD panel for projection 109 from the optical path for projection in the direction of the arrow sign, the projection lens 110 is pulled out to externally from the chassis of the portable telephone 200. At this time, the LCD panel for projection 109 is shifted manually or automatically together with the operation to set the lighting mode. If the LCD panel for projection 109 is made to retract automatically, then, when the lighting mode is being set, not only is the power supply to the light source 108 turned ON, but also the power supply to the circuit for retraction, in other words to the driver 113, is also turned ON. Due to this, the LCD panel for projection 109 is automatically shifted together with the operation for setting the lighting mode. However, the power supply for the light source 108 is turned ON after the LCD panel for projection 109 has completed its shifting and is fully retracted to its predetermined position. Along with turning the illumination OFF during the period over which the shifting takes place because having the illumination ON would be meaningless, this also is done with a view to alleviation of the load upon the battery by reducing the maximum consumption of electrical power. Whether the LCD panel for projection 109 has completed its retraction or not is detected based upon the value detected by the position detector 116.

Third Embodiment

Next, a portable telephone device according to a third embodiment of the present invention will be explained using FIGS. 20 through 22. In this third embodiment, a digital camera unit (a photographic unit) and a projector unit are contained in a portable type information device, for example a portable telephone, so that the photographic lens of the digital camera unit and the projection lens of the projector unit can also be used as a single lens system. In concrete terms, implementation of compactification of the system is provided by making the digital camera unit and the projector unit as an integrated construction.

The structure of a monolithic block 303 which constitutes the photographic unit and the projector unit is shown in FIGS. 20(a) and 20(b). FIG. 20(a) shows an example in which a half mirror 301 is installed in the monolithic block 303. When the monolithic block 303 is operated as a projector unit, half of the light flux from the light source 108 and the LCD panel for projection 109 is reflected by the half mirror 301 towards the lens 302. At this time, the lens 302 functions as a projection lens, and the data for projection which is created upon the LCD panel for projection 109 is projected upon an external screen. On the other hand, when the monolithic block 303 operates as a photographic unit, the lens 302 is used as a lens for photography. At this time, half of the light flux from the subject which has passed through the photographic lens 302 then passes through the half mirror 301 and is received by the image sensor 103.

FIG. 20(b) shows a variant embodiment for the arrangement of the light source 108, the LCD panel for projection 109 and the image sensor 103 in the monolithic or integrated block 303. When the monolithic block 303 is operating as a projector unit, the light flux from the light source 108 and the LCD panel for projection 109 which has passed through the half mirror 301 is projected to the exterior via the lens 302. And, when the monolithic block 303 is functioning as a photographic unit, the light flux from the subject which has passed through the lens 302 is reflected by the half mirror 301 towards the image sensor 109.

Since there is no difference in the performance due to the arrangements within the monolithic block 303 shown in FIGS. 20(a) and 20(b), accordingly it will be acceptable to decide upon any one of these arrangements according to the arrangement relationship with other blocks internal to the chassis of the portable telephone, and according to the ease of heat dissipation and the like. Furthermore, it becomes possible to perform both projector operation and photographic operation at the same time by using the half mirror 301. By doing this, as previously described, irradiation of supplementary AF light, irradiation of flash light during photography, and illumination operation before photography or during a telephone conversation become possible, even though the lens for photography and the photographic lens are both provided by a single lens system.

Figure 20:
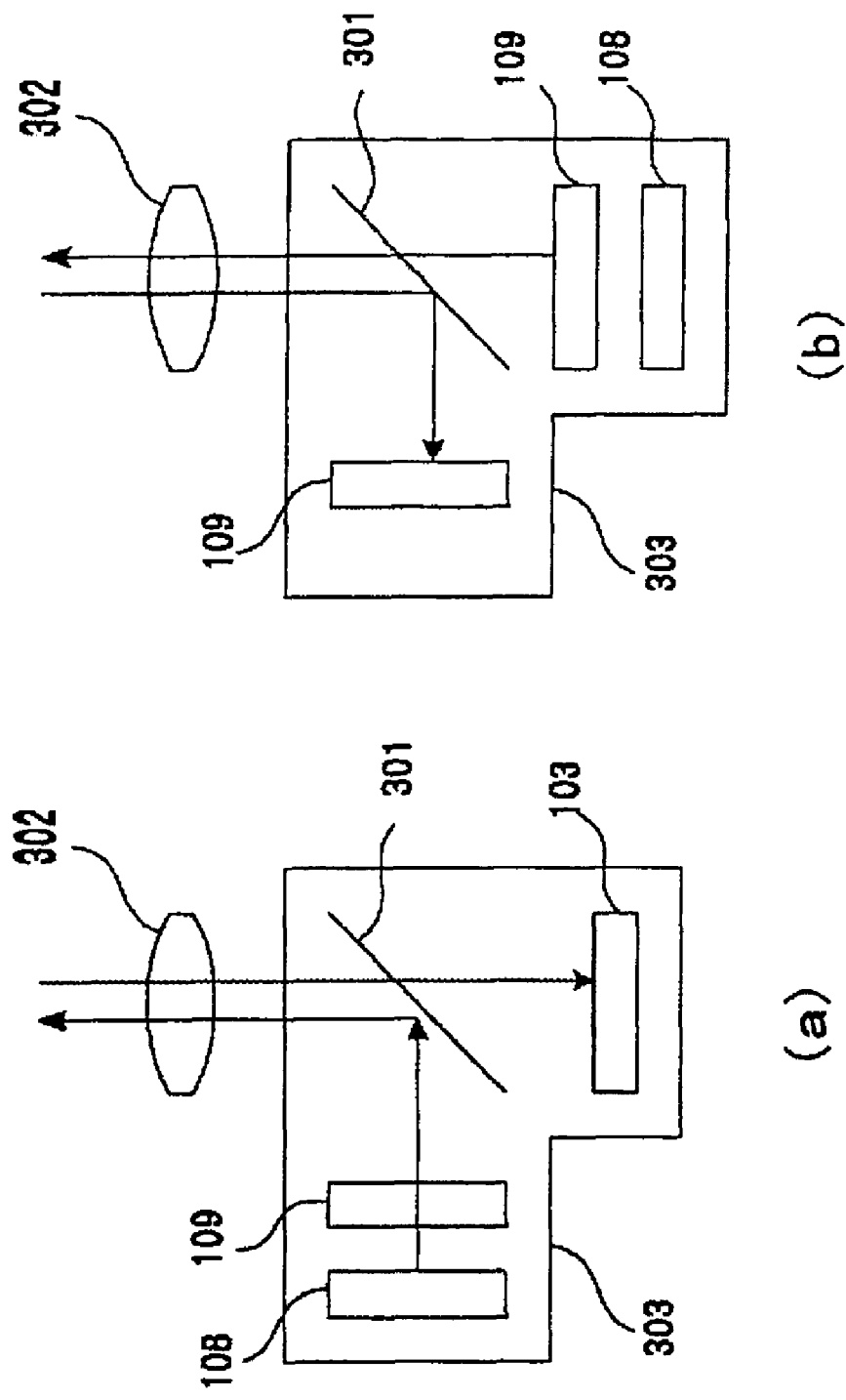
FIGS. 20(a) and 20(b) are figures for explanation of an example in which, in a portable telephone equipped with a projector function according to the third embodiment, a photographic unit and a projector unit are formed as an integrated structure.
Figure 21:
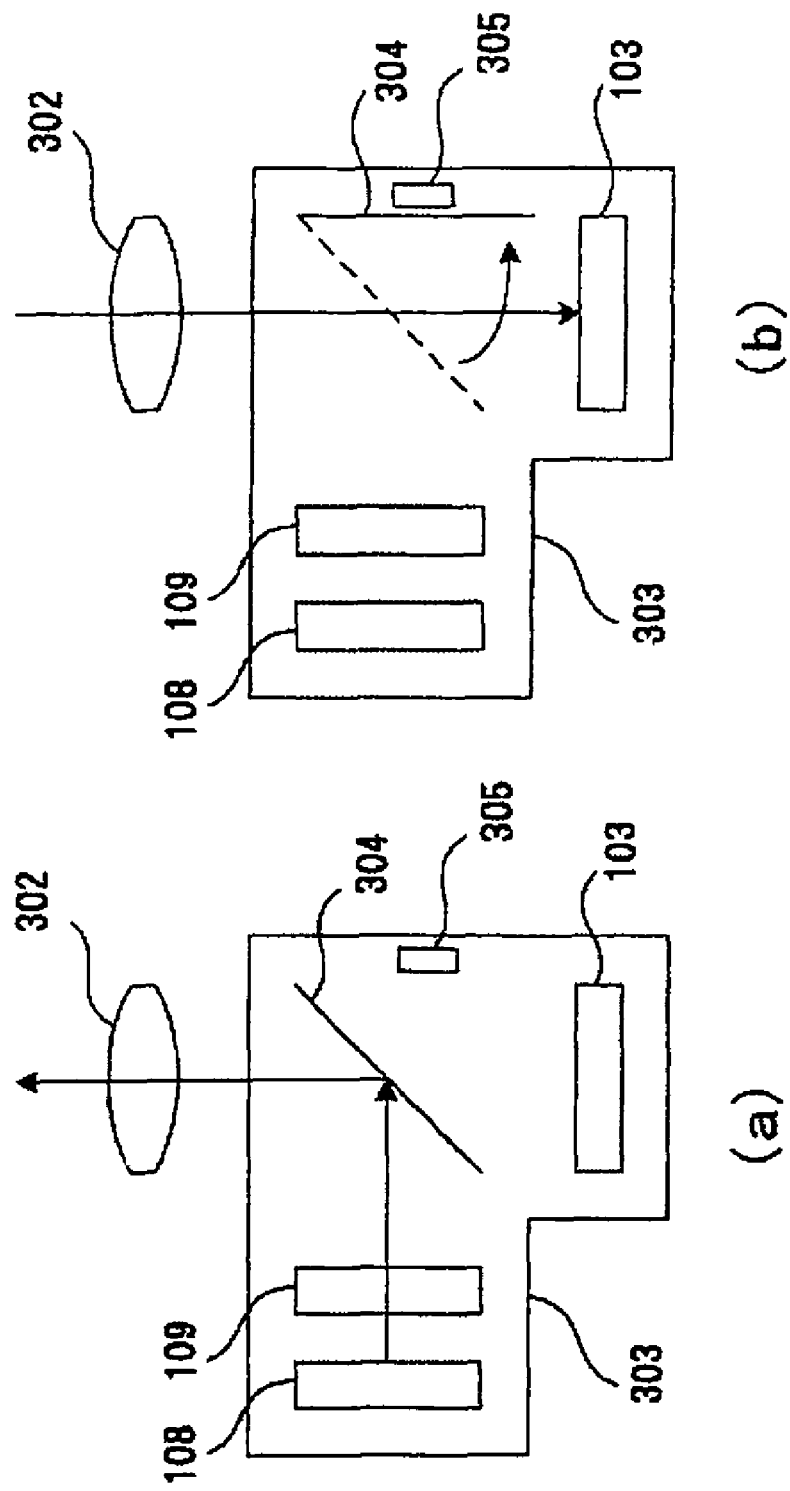
FIGS. 21(a) and 21(b) are figures for explanation of another example in which, in a portable telephone equipped with a projector function according to the third embodiment, the photographic unit and the projector unit are formed as an integrated structure.

FIG. 21 shows a structure in which a total reflection mirror 304 is installed in a monolithic block 303A, instead of the half mirror 301 which was used with the monolithic block 303 shown in FIG. 20. FIG. 21(a) shows the case when the light flux from the LCD panel for projection 109 is reflected by the total reflection mirror 304, so that the data for projection is projected to the exterior by the projection lens 302. And FIG. 21(b) shows the situation with the total reflection mirror 304 having been rotated and retracted from the optical path, so that the light flux from the subject is received by the image sensor 103.

A detector 305 detects whether the total reflection mirror 304 is in its position for projection or in its position for light to be received by the image sensor 103. The total reflection mirror 304 is driven by a drive circuit not shown in the figures, and is shifted to its position for projection as shown in FIG. 21(a) when the operational mode for projection by the projector or the operational mode for illumination is set, while it is shifted to its position for light reception shown in FIG. 21(b) when the photographic operational mode is set. It should be understood that, instead of rotating the total reflection mirror 304, it would also be acceptable to provide a structure in which it is moved out from the optical path by parallel shifting.

By building the monolithic block 303A as shown in FIGS. 21(a) and 21(b), it is possible to utilize the light flux during projection/illumination operation by the projector unit and during photographic operation by the photographic unit with 100% efficiency. However, since it is not possible to perform both of these operations at the same time, according to the usage objective or the product specification, it may be better to employ either the structure shown in FIGS. 20(a) and 20(b), or the structure shown in FIGS. 21(a) and 21(b). Furthermore, with the monolithic block 303A shown in FIGS. 21(a) and 21(b) as well, it would also be acceptable to change the positions of the light source 108, the LCD panel for projection 109, and the image sensor 103 as shown in FIG. 20(b).

Figure 22:
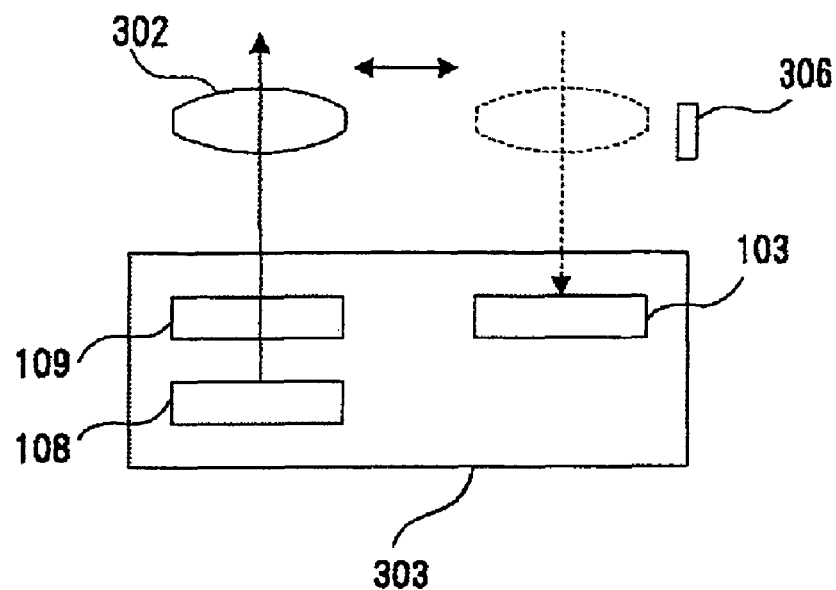
FIG. 22 is a figure for explanation of another example in which, in a portable telephone equipped with a projector function according to the third embodiment, the photographic unit and the projector unit are formed as an integrated structure.

FIG. 22 shows the structure of a monolithic block 303B which constitutes the photographic unit and the projector unit. The light source 108, the LCD panel for projection 109, and the image sensor 103 are arranged in this monolithic block 303B so that the light flux for projection from the light source 108 and the LCD panel for projection 109 becomes parallel to the light flux from the subject for being incident upon the image sensor 103. The lens 302 operates together with the setting of the selection dial 208 which is provided to the portable telephone 200, is shifted manually or electrically, and is made so as to function both as a projection lens and as a lens for photography. It should be understood that the selection dial 208 is supposed to be built so as to be able to set either the projector mode, including illumination operation, or the photographic mode. And a detector 306 detects whether the lens 302 is in its position for projection operation shown by the solid lines in FIG. 22, or in its photographic position as shown by the dotted lines.

Figure 7:
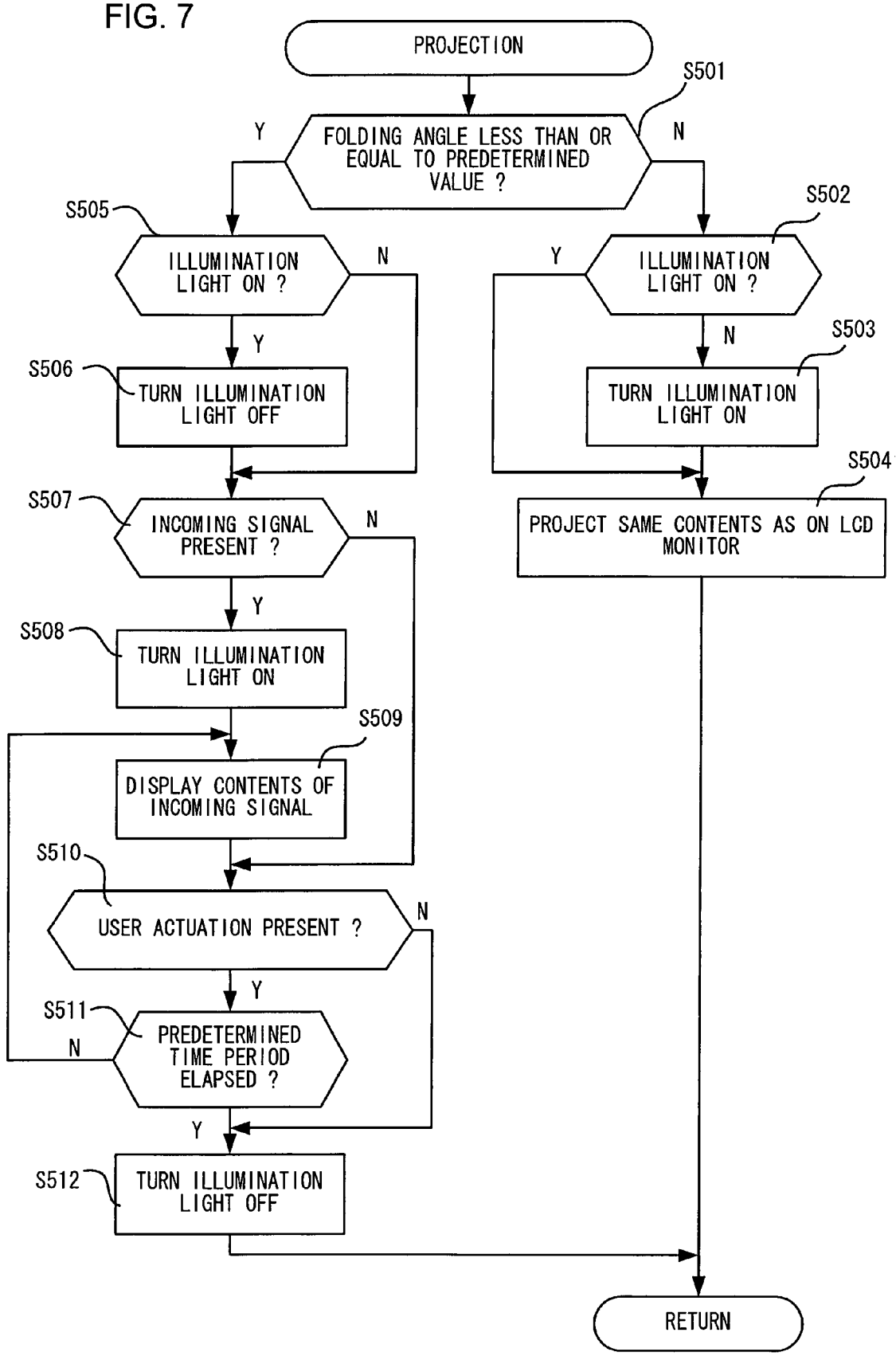
FIG. 7 is a flow chart for explanation of projection operation of this portable telephone equipped with a projector function.
Figure 8:
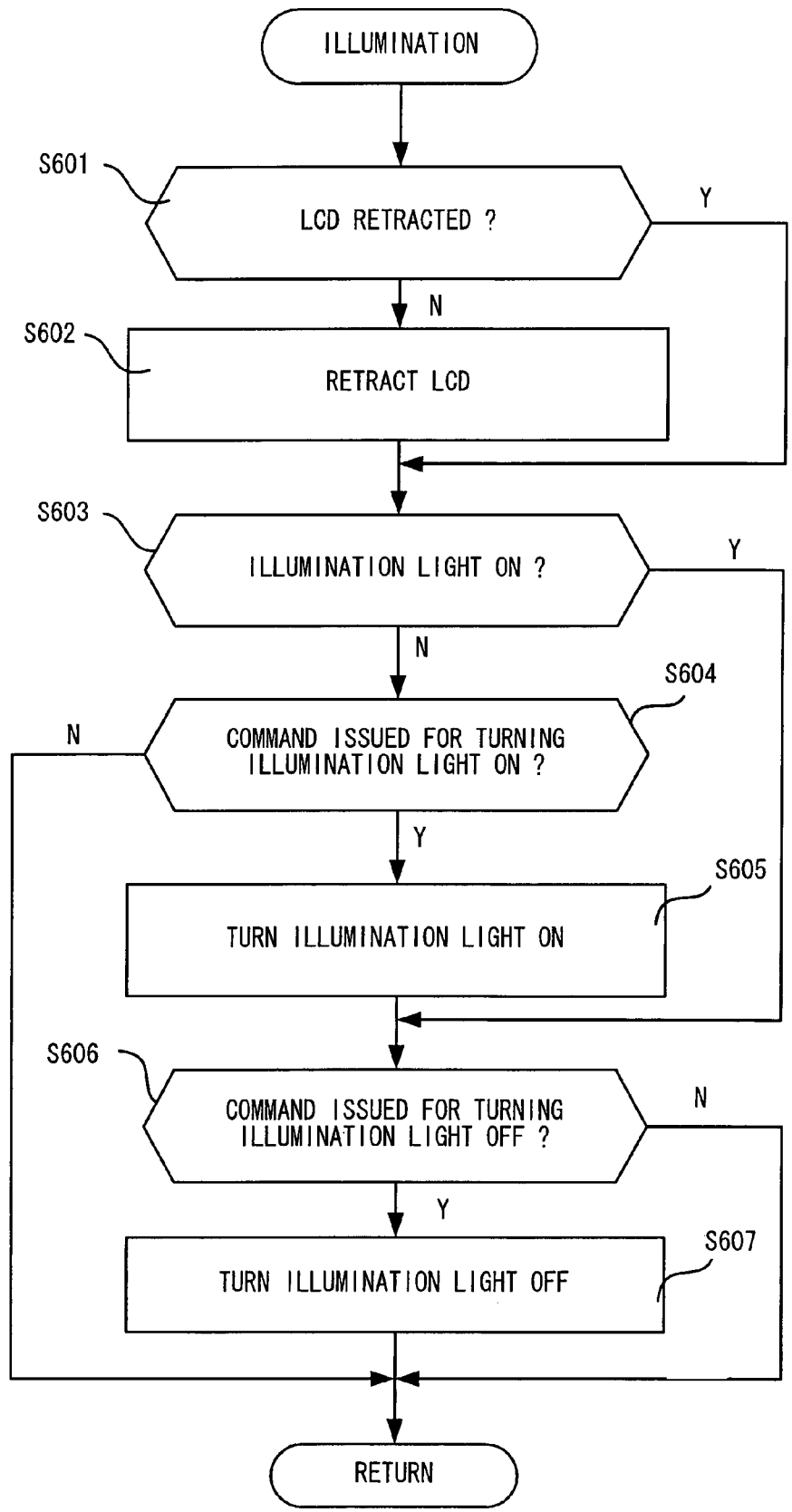
FIG. 8 is a flow chart for explanation of illumination operation of this portable telephone equipped with a projector function.

It should be understood that, if the total reflection mirror 304 as shown in FIGS. 21(a) and 21(b) is used, or if a structure in which the lens 302 is shifted is employed as shown in FIG. 22, steps should be inserted at the beginning of the flow of control for photographic operation shown in FIG. 4, of the flow of control for projection operation shown in FIG. 7, and of the flow of control for illumination operation shown in FIG. 8, for confirming whether the mirror 304 is retracted, whether the lens 302 is set to the side of the optical path which is to be used, or the like. However, if illumination operation is to be executed by the projector unit, in order to perform illumination operation properly while at the same time keeping down the maximum consumption of electrical power, it is desirable for the processing for confirming the positions of the mirror 304 or the lens 302 to be performed at separate timings. In other words, when starting illumination, the light source 108 is turned ON so as to put the illumination ON, only after having detected that the mirror 302 or the lens 304 has been shifted to their respective predetermined positions for projection. On the other hand, when turning the illumination OFF, the illumination may be turned OFF immediately, irrespective of the position of the mirror 302 or the lens 304.

In the structure shown in FIGS. 19, 21(a) and 21(b), and 22, the end of the shifting of the LCD panel for projection 109, the lens 302, or the total reflection mirror 304 was detected by respective detectors. However, it would also be acceptable not to utilize any such detectors, but simply to decide upon the shifted state with the CPU 120, according to the results of the shifting commands for these members.

In the first through the third embodiments explained above, cases have been explained where the portable telephone 200 is used as a portable type information device, and a projector function has been installed to the portable telephone 200. However, the present invention is not limited to this; it would also be possible to use, for example, a digital camera or a PDA (a portable type information terminal) as the portable type information device, and to install a projection function upon these. In other words, the portable type information device according to the present invention may be of any type, provided that it is endowed with at least any one of a photographic function and a communication/information processing function, and with a projector function, and that it is compact and portable. It should be understood that a portable telephone, a PDA, a digital camera, or the like can also be considered as a portable type electronic device which processes various types of information such as email and images and so on. Moreover, the structure of the portable telephone 200 is not limited to the fold up type structure as shown in FIG. 2; of course, the portable telephone could also be of the flat type. In this case, it would be possible to omit the angle detector 119 which detects the angle of inclination of the portable telephone 200.

Moreover, in the first through the third embodiments described above, the control of the projection pattern created upon the LCD panel for projection 109 and the retraction control of the LCD panel for projection 109 were explained as being performed by the driver 113. However, of course, it would also be possible to control the projection pattern and to control the retraction of the LCD pattern for projection 109 with individual separate devices.

It should be understood that, in the first through the third embodiments described above, the illumination pattern of the illumination light which was used as the supplementary AF light was explained as being different from the illumination pattern of the illumination light which was used as the flash light. However, the present invention is not limited by this feature; of course, both when photographing the subject once (single shot) and also in the consecutive photography mode, it would be possible to illuminate the illumination light for the supplementary AF light and for the flash light according to the same illumination pattern.

It should be understood that, although various embodiments and variations thereof have been explained, the present invention is not limited by the details thereof. Other modes are also included within the range of the present invention, provided that they are considered as being within its technical concept. For example, although it was arranged for the illumination unit or the illumination means to comprise a plurality of LEDs or an organic EL element, it would also be possible to employ various other types of element, having a plurality of light emitting portions, for this construction. In the same manner, the image creation unit and the image formation means are not limited by the embodiment described above.

The contents of the disclosure of the following application upon which priority is claims is hereby incorporated by reference:

Japanese Patent Application No. 2004-273234 (filed on 21 Sep. 2004).

The invention claimed is:

1. A projector, comprising:
   an image creation unit that projects image information upon a screen, comprising a plurality of picture elements that create an image pattern corresponding to the image information; and
   an illumination unit in which light emitting members are disposed upon a vertical plane in different locations with respect to an optical axis which passes through a center of the image creation unit, at equal distances from the optical axis;
   a portable telephone functional portion for performing communication that is external to the projector;
   a chassis unit that houses the image creation unit, the illumination unit and the portable telephone functional portion, and that is formed with two chassis components connected together by a hinge construction about which the two chassis components are able to swing;
   an angle detector, disposed in the chassis unit, that detects an angle subtended between the two chassis components; and
   a controller, disposed in the chassis unit, that controls the image creation unit and the illumination unit so as to project image information indicating receipt of a communication when the portable telephone functional portion has received the communication, while the angle detected by the angle detector is less than a predetermined angle and the projector is set in a projector mode for performing a projection operation.

2. A projector according to claim 1, wherein:
   each of the light emitting members emits light of a single individual color.

3. A projector according to claim 2, wherein:
   the emitted light of a single color is any one of white colored light, red colored light, green colored light, blue colored light, and yellow colored light.

4. A projector according to claim 1, wherein:
   the illumination unit comprises light emitting members all of which emit light of a same color.

5. A projector according to claim 1, wherein:
   the illumination unit comprises light emitting members which emit light of two or more colors.

6. A projector according to claim 5, wherein:
   in the light emitting members which emit light of two or more colors, only one light emitting member of each color is used.

7. A projector according to claim 5, further comprising:
   an illumination control unit that selects and turns on a light emitting member of a predetermined light emitting color from among the light emitting members.

8. A projector according to claim 7, wherein:
   the illumination control unit illuminates the selected light emitting member continuously.

9. A projector according to claim 7, wherein:
   the illumination control unit illuminates the selected light emitting members in order in time series at predetermined time intervals.

10. A projector according to claim 9, further comprising:
an image control unit that creates a predetermined image upon the image creation unit according to the light emitting members selected by the illumination control unit.

11. A projector according to claim 1, wherein:
a total area of light emitting portions of the light emitting members is made not to be greater than an area of the image creation unit.

12. A projector according to claim 1, wherein:
the light emitting members are light emitting diodes.

13. A projector according to claim 1, wherein:
the image creation unit is a liquid crystal.

14. A projector according to claim 1, wherein:
the image creation unit is a Digital Micromirror Device.

15. A projector according to claim 1, wherein: the illumination unit is positioned next to the image creation unit.

16. A projector, comprising:
an image creation unit, through which image information is projected upon a screen, that comprises a plurality of picture elements that create an image pattern corresponding to the image information;
a light emitting diode constituting a single light emitting member of an area substantially equal to an area of the image creation unit;
a portable telephone functional portion for performing communication that is external to the projector;
a chassis unit that houses the image creation unit, the light emitting diode and the portable telephone functional portion, and that is formed with two chassis components connected together by a hinge construction about which the two chassis components are able to swing;
an angle detector, disposed in the chassis unit, that detects an angle subtended between the two chassis components; and
a controller, disposed in the chassis unit, that controls the image creation unit and the light emitting diode so as to project image information indicating receipt of a communication when the portable telephone functional portion has received the communication, while the angle detected by the angle detector is less than a predetermined angle and the projector is set in a projector mode for performing a projection operation.

17. A projector according to claim 16, wherein: the light emitting diode is positioned next to the image creation unit.

* * * * *